US006967682B1

(12) United States Patent
Hagihara

(10) Patent No.: US 6,967,682 B1
(45) Date of Patent: Nov. 22, 2005

(54) PHOTOELECTRIC CONVERTING DEVICE

(75) Inventor: Yoshio Hagihara, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/537,425

(22) Filed: Mar. 27, 2000

(30) Foreign Application Priority Data

Mar. 29, 1999 (JP) ................................ 11-086388
Mar. 29, 1999 (JP) ................................ 11-086794
Sep. 30, 1999 (JP) ................................ 11-278357

(51) Int. Cl.[7] ............................................ H04N 5/335
(52) U.S. Cl. ...................................... 348/308; 348/301
(58) Field of Search ................................ 348/294, 297, 348/300, 301, 302, 308, 241; 250/208.1, 250/214 L

(56) References Cited

U.S. PATENT DOCUMENTS 4,973,833 A 11/1990 Takada et al
5,289,286 A 2/1994 Nakamura et al
5,861,621 A 1/1999 Takebe et al
6,323,479 B1 * 11/2001 Hynecek et al. ......... 250/214 L
6,795,117 B2 * 9/2004 Tay ............................ 348/241
6,809,768 B1 * 10/2004 Merrill ....................... 348/308
2001/0045508 A1 * 11/2001 Dierickx ................. 250/208.1

OTHER PUBLICATIONS

U.S. Appl. No. 60/100556, filed Sep. 1998, Hynecek et al.*

* cited by examiner

*Primary Examiner*—Tuan Ho
(74) *Attorney, Agent, or Firm*—Sidley Austin Brown & Wood LLP

(57) ABSTRACT

In a photoelectric converting device, a photoelectric current (electric signal) generated by light entering a photodiode PD causes the gate voltage of MOS transistors T1 and T2 to rise, and thus a current corresponding to this gate voltage flows through the MOS transistor T2 into a capacitor C, shifting the voltage at the node "a" between the MOS transistor T2 and the capacitor C. Here, when the voltage ϕVPS applied to the source of the MOS transistor T1 is adjusted in such a way that the MOS transistor T1 operates in a subthreshold region below its threshold level, the voltage at the node "a" varies on a natural-logarithm basis with respect to the photoelectric current. By contrast, when the voltage ϕVPS applied to the source of the MOS transistor T1 is kept approximately equal to a direct-current voltage VPD, the voltage at the node "a" varies on a linear basis with respect to the photoelectric current.

52 Claims, 28 Drawing Sheets

PHOTOELECTRIC CONVERTING DEVICE

This application is based on Japanese Patent Applications Nos. H11-086388, H11-086794, and H11-278357 respectively filed on Mar. 29, 1999, Mar. 29, 1999, and Sep. 30, 1999, the contests of which are hereby incorporated by reference.

BACKGROUND OF THE INVENTION

1. Field of the Invention

The present invention relates to a photoelectric converting device, and particularly to a photoelectric converting device having pixels arranged in a two-dimensional array.

2. Description of the Prior Art

Two-dimensional photoelectric converting devices are used in various applications. A two-dimensional photoelectric converting device has pixels arranged in a matrix (two-dimensional array), and those pixels each include a photoelectric converting element (photosensitive element) such as a photodiode and a means for transferring the photoelectric charge generated in the light receiving element to an output signal line. Such photoelectric converting devices are roughly grouped into CCD-type and MOS-type devices. CCD-type devices achieve transfer of photoelectric charge while accumulating it in potential wells, and thus has the disadvantage of a narrow dynamic range. On the other hand, MOS-type devices directly read the charge accumulated in the pn junction capacitance of the photodiodes.

Now, how each pixel is configured in a conventional MOS-type photoelectric converting device will be described with reference to FIG. 47. As shown in this figure, a photodiode PD has its cathode connected to the gate of a MOS transistor T101 and to the source of a MOS transistor T102. The MOS transistor T101 has its source connected to the drain of a MOS transistor T103, and this MOS transistor T103 has its source connected to an output signal line VOUT. A direct-current voltage VPD is applied to the drain of the MOS transistor T101 and to the drain of the MOS transistor T102, and a direct-current voltage VPS is applied to the anode of the photodiode.

When light enters the photodiode PD, photoelectric charge is generated therein, and this electric charge is accumulated at the gate of the MOS transistor T101. Here, when a pulse signal $\phi V$ is fed to the gate of the MOS transistor T103 to turn the MOS transistor T103 on, a current proportional to the charge accumulated at the gate of the MOS transistor T101 flows through the MOS transistors T101 and T103 to the signal output line. In this way, it is possible to read the output current that is proportional to the amount of incident light. After this signal has been read, the MOS transistor T103 is turned off and thereby the MOS transistor T102 is turned on so that the gate voltage of the MOS transistor T101 will be initialized.

As described above, in a conventional MOS-type photoelectric converting device, at each pixel, the photoelectric charge generated in the photodiode PD and then accumulated at the gate of the MOS transistor T101 is directly read out. This, however, leads to a narrow dynamic range and thus demands accurate control of the amount of exposure. Moreover, even if the amount of exposure is controlled accurately, the obtained image tends to suffer from flat blackness in dim portions thereof and saturation in bright portions thereof.

On the other hand, the assignee of the present invention has once proposed a photoelectric converting device including a photosensitive element that generates a photoelectric current in accordance with the amount of incident light, a MOS transistor to which the generated photoelectric current is fed, and a bias circuit that supplies a bias to the MOS transistor to bring it into a state in which a subthreshold current flows therethrough, wherein the photoelectric current is subjected to logarithmic compression conversion (refer to U.S. Pat. No. 4,973,833). This photoelectric converting device offers a wide dynamic range, but there is room for improvements of performance and S/N (signal-to-noise) ratio in low-light conditions (low-brightness conditions). Moreover, this photoelectric converting device also suffers from a comparatively large pixel size, because an integrator circuit having a capacitor needs to be incorporated in each pixel.

SUMMARY OF THE INVENTION

An object of the present invention is to provide a novel and useful photoelectric converting device that offers a wide dynamic range.

Another object of the present invention is to provide a photoelectric converting device having a satisfactorily small pixel size.

Still another object of the present invention is to provide a photoelectric converting device that permits the pixels thereof to yield output signals in an extremely stable state.

To achieve the above object, according to one aspect of the present invention, a photoelectric converting device is provided with a photoelectric conversion circuit (PCC) for generating an analog electric signal in accordance with the amount of incident light. This PCC is selectively operable, irrespective of the amount of the light, in either one of (1) a first mode in which the PCC generates the analog electric signal in such a way that the intensity thereof is logarithmically proportional to the amount of the light and (2) a second mode in which the PCC generates the analog electric signal in such a way that the intensity thereof is linearly proportional to the amount of the light.

With a photoelectric converting device configured as described above, it is possible to vary the dynamic range in accordance with the light and other environmental conditions in which a subject is shot. For example, in a case where photoelectric charge generated in the light receiving element is converted by means of a MOS transistor, if this MOS transistor is made to operate in a subthreshold region below its threshold level, conversion is performed logarithmically (the first mode). This offers a wider dynamic range. However, when shooting a moving subject in low-light conditions, such logarithmic conversion suffers from not negligible afterimages.

The reason is as follows. In logarithmic conversion, the MOS transistor is kept on, and the electric signal generated by the light receiving element is converted by and output from the MOS transistor on a real-time basis. However, the electric charge accumulated at the gate of the MOS transistor and the electric charge accumulated in the parasitic capacitance of the light receiving element connected to that gate remain undischarged, and thus the data a moment ago persists as an afterimage. Such afterimages are particularly not negligible in low-light conditions. Moreover, in general, logarithmic conversion produces a comparatively low output, and thus suffers from a relatively poor S/N ratio.

By contrast, linear conversion (the second mode), performed with the MOS transistor off, offers only a narrow dynamic range, but permits a high output to be obtained from the photoelectric conversion circuit, and thus offers a satisfactory S/N ratio. Moreover, the accumulated photoelectric charge is integrated and reset by the gate of the MOS transistor in its off state and by the light receiving element, and thus the data a moment ago does not persist.

Accordingly, it is preferable to switch the photoelectric conversion circuit (PCC) to the first mode (logarithmic conversion) when shooting a subject lit with greatly varying brightness (i.e. varying in a wide range from very low to very high brightness), and switch the photoelectric conversion circuit to the second mode (linear conversion) when shooting a low-brightness subject or a subject with a narrow brightness range.

According to another aspect of the present invention, a photoelectric converting device is provided with: a photoelectric conversion circuit (PCC) for generating an analog electric signal in accordance with the amount of incident light. This PCC is selectively operable, based on a signal inputted to the photoelectric converting device, in either one of (1) a first mode in which the PCC generates the analog electric signal in such a way that the intensity thereof is logarithmically proportional to the amount of the light and (2) a second mode in which the PCC generates the analog electric signal in such a way that the intensity thereof is linearly proportional to the amount of the light.

According to still another aspect of the present invention, a photoelectric converting device is provided with: a photoelectric conversion circuit (PCC) for generating an analog electric signal in accordance with the amount of incident light in such a way that the intensity of the analog electric signal is logarithmically proportional to the amount of the light; and an amplifying circuit, connected to the PCC, for amplifying the analog electric signal outputted from the PCC. Here, no capacitor is provided between the PCC and the amplifying circuit.

In a photoelectric converting device configured as described above, the electric signal that reflects the amount of light is converted by and output from the photoelectric conversion circuit on a natural-logarithm basis, and thus it is possible to obtain a wide dynamic range. Moreover, the signal from the photoelectric conversion circuit is amplified by the amplifying circuit, and thus it is possible to read the signals from the individual pixels in an extremely stable state. In this way, the signal from the photoelectric conversion circuit is output without being integrated but instead with amplification, and this helps simplify the pixel configuration and reduce the pixel size.

According to a further aspect of the present invention, a photoelectric converting device is provided with: a photoelectric conversion circuit (PCC) for generating an analog electric signal in accordance with the amount of incident light in such a way that the intensity of the analog electric signal is logarithmically proportional to the amount of the light; and an amplifying circuit, connected to the PCC, for amplifying the analog electric signal outputted from the PCC. Here, no integrator circuit is provided between the PCC and the amplifying circuit.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

<First Example of the Pixel Configuration>

Figure 1:
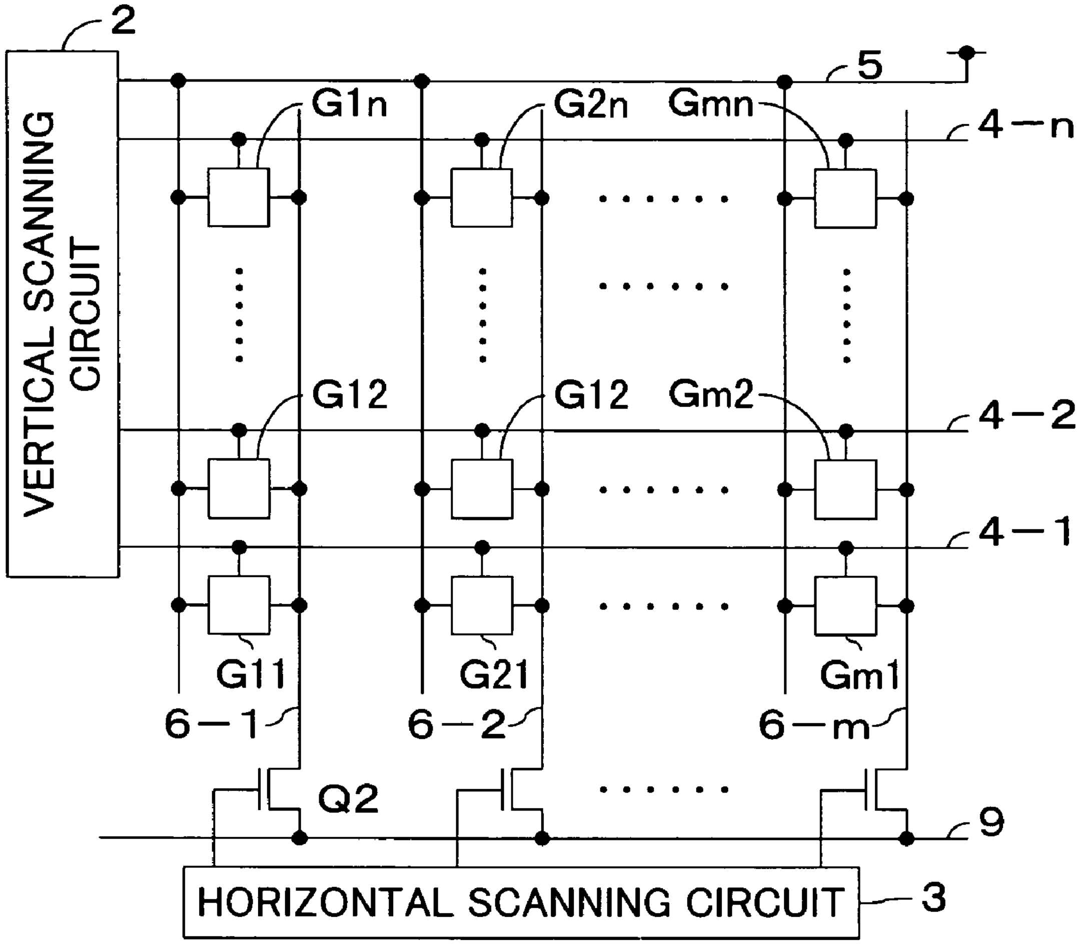
FIG. 1 is a block diagram illustrating the overall configuration of a two-dimensional photoelectric converting device embodying the invention.
Figure 2:
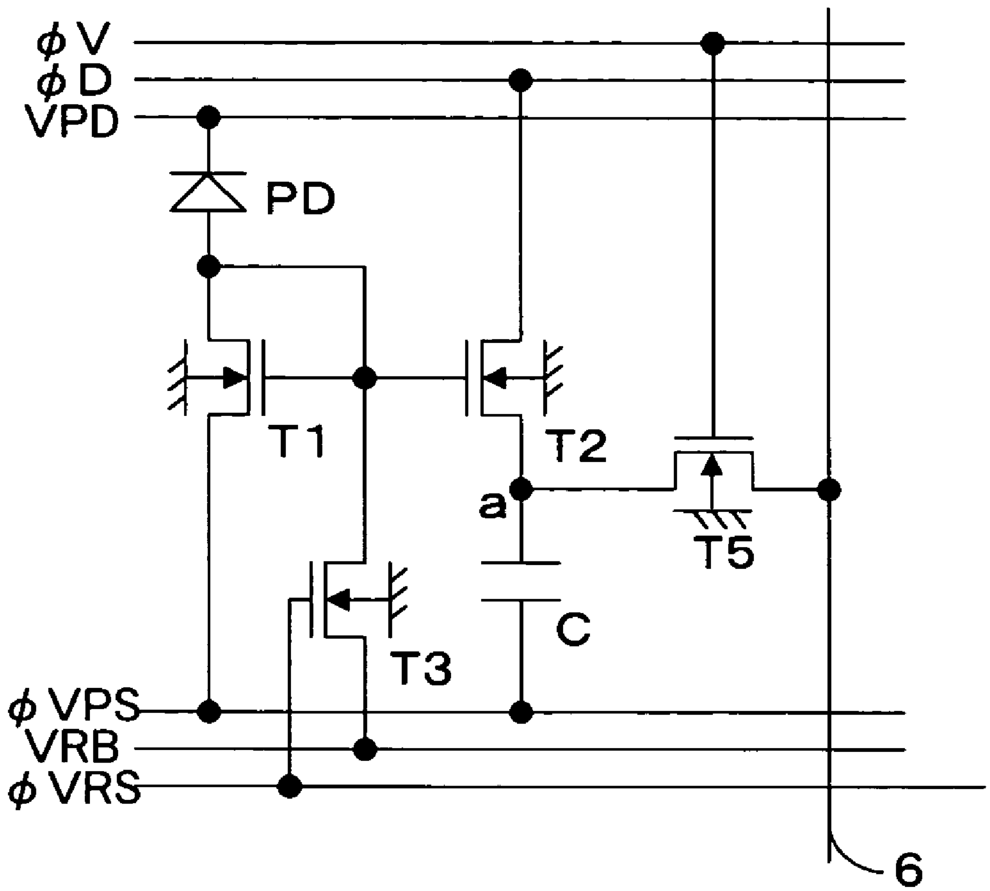
FIG. 2 is a circuit diagram showing the configuration of each pixel in a first embodiment of the invention.

Hereinafter, photoelectric converting devices embodying the present invention will be described with reference to the accompanying drawings. FIG. 1 schematically shows the configuration of part of a two-dimensional MOS-type photoelectric converting device embodying the invention. In this figure, reference symbols G11 to Gmn represent pixels that are arranged in a two-dimensional array (in a matrix). Reference numeral 2 represents a vertical scanning circuit, which scans lines (rows) 4-1, 4-2, . . . , 4-n sequentially. Reference numeral 3 represents a horizontal scanning circuit, which reads out, sequentially pixel by pixel in a horizontal direction, the signals fed from the individual pixels to output signal lines 6-1, 6-2, . . . , 6-m as a result of photoelectric conversion performed in those pixels. Reference numeral 5 represents a power line. The individual pixels are connected not only to the lines 4-1, 4-2, . . . , 4-n, to the output signal lines 6-1, 6-2, . . . , 6-m, and to the power line 5 mentioned above, but also to other lines (for example clock lines and bias supply lines). These other lines, however, are omitted in FIG. 1, and are shown in FIG. 2, which shows a first embodiment of the invention.

As shown in FIG. 1, for each of the output signal lines 6-1, 6-2, . . . , 6-m, one N-channel MOS transistor Q2 is provided. Here, a description will be given only with respect to the output signal line 6-1 as their representative. The MOS transistor Q2 has its drain connected to the output signal line 6-1, has its source connected to a signal line 9 serving as a final destination line, and has its gate connected to the horizontal scanning circuit 3. As will be described later, within each pixel, another N-channel MOS transistor (a fifth MOS transistor) T5 functioning as a switch is provided. Whereas this MOS transistor T5 serves to select a row, the MOS transistor Q2 serves to select a column.

First Embodiment

Now, a first embodiment of the invention, which is applicable to each pixel of the first example of the pixel configuration shown in FIG. 1, will be described with reference to the drawings relevant thereto. FIG. 2 is a circuit diagram showing the configuration of each pixel of the photoelectric converting device of this embodiment.

In FIG. 2, a pn photodiode PD serves as a photosensitive element (photoelectric conversion element). The anode of this photodiode PD is connected to the drain and the gate of a first MOS transistor T1, also to the gate of a second MOS transistor T2, and also to the drain of a third MOS transistor T3. The source of the MOS transistor T2 is connected to the drain of a fifth MOS transistor T5 for selecting a row. The source of this MOS transistor T5 is connected to the output signal line 6 (this output signal line 6 corresponds to one of the output signal lines 6-1, 6-2, . . . , 6-m). The MOS transistors T1, T2, T3, and T5 are all N-channel MOS transistors, and have their back gates grounded.

A direct-current voltage VPD is applied to the cathode of the photodiode PD. On the other hand, a signal ϕVPS is applied to the source of the MOS transistor T1, and also to one end of a capacitor C of which the other end is connected to the source of the MOS transistor T2. A direct-current voltage VRB is applied to the source of the MOS transistor T3, and a signal ϕVRS is fed to the gate of the same MOS transistor T3. A signal ϕD is fed to the drain of the MOS transistor T2. Moreover, a signal ϕV is fed to the gate of the MOS transistor T5. It is to be noted that, in this embodiment, the signal ϕVPS is a binary signal that takes one of two predetermined levels, i.e. either a low level or a high level, at a time. Here, a low level refers to a level that causes the MOS transistors T1 and T2 to operate in a subthreshold region, and a high level is a level that is approximately equal to the direct-current voltage VPD.

In this embodiment, by switching the voltage of the signal ϕVPS and thereby switching the bias to the MOS transistor T1, it is possible to switch between two modes of conversion so as to allow the output signal fed from each pixel to the output signal line 6 to vary either on a natural-logarithm basis or on a linear basis with respect to the electric signal (hereinafter referred to as the "photoelectric current") that the photodiode PD outputs in accordance with the amount of light striking it. These two modes will be described individually below.

(1) Mode in which the Output Signal is Produced by Converting the Photoelectric Current on a Natural-Logarithm Basis First, with reference to FIGS. 2, 3A, and 3B, a description will be given of how conversion is achieved when the signal ϕVPS is kept at a low level to permit the MOS transistors T1 and T2 to operate in a subthreshold region. In this mode, where the signal ϕVRS fed to the gate of the MOS transistor T3 is kept at a low level, the MOS transistor T3 remains off, and can thus be ignored as substantially absent.

Figure 3A:
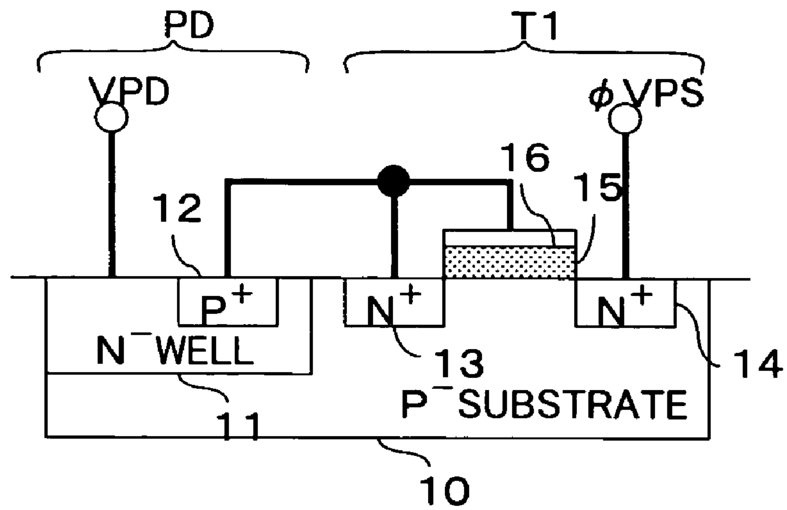
FIGS. 3A, 3B, and 3C are diagrams showing the structure of each pixel and the relationship among relevant potentials according to the invention.
Figure 3B:
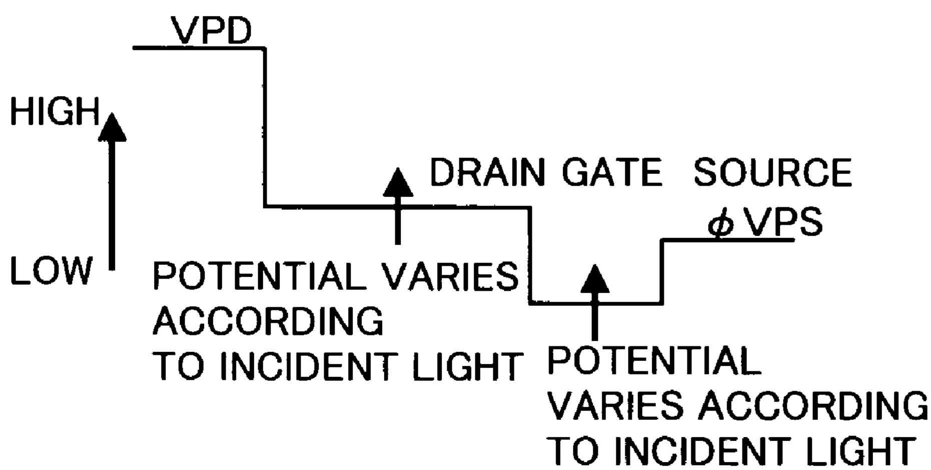

As shown in FIG. 3A, the photodiode PD is formed, for example, by forming an N-type well layer 11 in a P-type semiconductor substrate (hereinafter referred to as the "P-type substrate") 10 and then forming, in this N-type well layer 11, a P-type diffusion layer 12. On the other hand, the MOS transistor T1 is formed by forming N-type diffusion layers 13 and 14 in the P-type substrate 10 and then forming, on top of the channel left between those N-type diffusion layers 13 and 14, an oxide film 15 and, further on top thereof, a polysilicon layer 16. Here, the N-type well layer 11 functions as the cathode of the photodiode PD, and the P-type diffusion layer 12 functions as the anode thereof. On the other hand, the N-type diffusion layers 13 and 14 function as the drain and the source, respectively, of the MOS transistor T1, and the oxide film 15 and the polysilicon layer 16 function as the insulating film and the gate electrode, respectively, thereof. Configured in this way, the photodiode PD and the MOS transistor T1 have potentials as shown in FIG. 3B when the signal φVPS is at a low level.

In the circuit shown in FIG. 2, when light enters the photodiode PD, a photoelectric current is generated therein, and, due to the subthreshold characteristics of MOS transistors, a voltage having the value obtained by converting the photoelectric current on a natural-logarithm basis appears at the gates of the MOS transistors T1 and T2. This voltage causes a current to flow through the MOS transistor T2, and, as a result, electric charge that is equivalent to the value obtained by converting the integral of the photoelectric current on a natural-logarithm basis is accumulated in the capacitor C. That is, a voltage proportional to the value obtained by converting the integral of the photoelectric current on a natural-logarithm basis appears at the node "a" between the capacitor C and the source of the MOS transistor T2. Here, the MOS transistor T5 remains off.

Next, the signal φV, which is a pulse signal, is fed to the gate of the MOS transistor T5 to turn this MOS transistor T5 on. This causes the electric charge accumulated in the capacitor C to be fed as the output current to the output signal line 6. This current thus fed to the output signal line 6 has the value obtained by converting the integral of the photoelectric current on a natural-logarithm basis. In this way, it is possible to read a signal (output current) that is proportional to the logarithm of the amount of incident light. After this signal has been read, the MOS transistor T5 is turned off. Thereafter, while the MOS transistor T5 is kept off, the signal φD is turned to a low level, so that the electric charge accumulated in the capacitor C is discharged through the MOS transistor T2 to the signal line of the signal φD, and thereby the potential at the capacitor C, and thus at the node "a", is initialized. By repeating this sequence of operations at regular time intervals, it is possible to shoot continuously an ever-changing subject image with a wide dynamic range. It is to be noted that, when the output current is so controlled as to vary on a natural-logarithm basis with respect to the amount of incident light as in this mode, the signal φVRS is kept at a low level all the time.

Figure 3C:
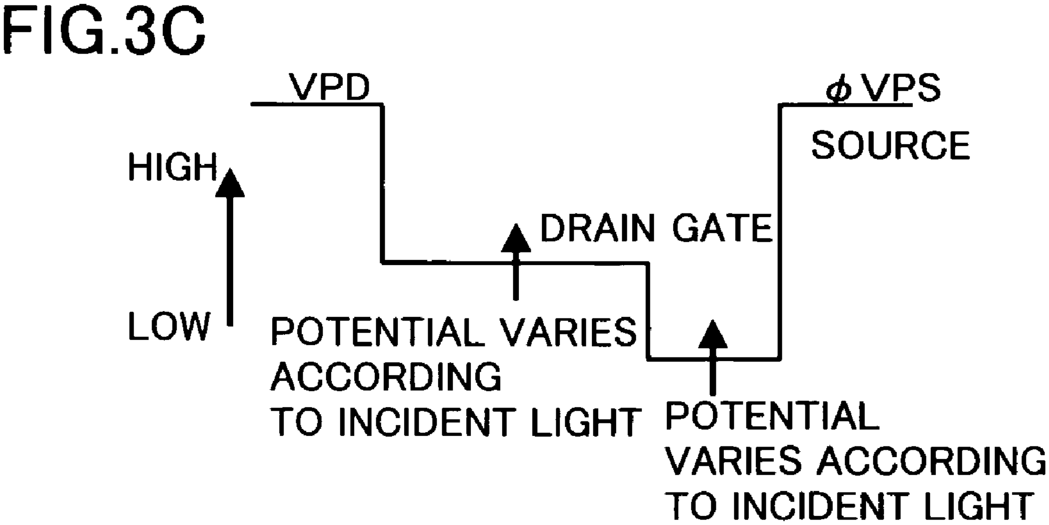

(2) Mode in which the Output Signal is Produced by Converting the Photoelectric Current on a Linear Basis Next, a description will be given of how conversion is achieved when the signal φVPS is kept at a high level. In this mode, the photodiode PD and the MOS transistor T1 have potentials as shown in FIG. 3C. Accordingly, the MOS transistor T1 is kept substantially off, and thus no current flows through the channel between the source and the drain thereof. Moreover, the signal φVRS fed to the gate of the MOS transistor T3 is kept at a low level, and thus this MOS transistor T3 is kept off.

First, the MOS transistor T5 is turned off, and the signal φD is turned to a low level (to a potential lower than the signal φVPS), so that the electric charge in the capacitor C flows through the MOS transistor T2 to the signal line of the signal φD, and thereby the capacitor C is reset. As a result, the potential at the node "a" is initialized, for example, to a potential lower than the direct-current voltage VPD. This potential is maintained by the capacitor C. Thereafter, the signal φD is turned back to a high level (to a potential equal to or close to the direct-current voltage VPD). In this state, when light enters the photodiode PD, a photoelectric current is generated therein. At this time, since capacitors exist between the back gate and the gate of the MOS transistor T1 and at the junction of the photodiode PD, the electric charge resulting from the photoelectric current is accumulated mainly at the gates of the MOS transistors T1 and T2. Thus, the gate voltage of the MOS transistors T1 and T2 has the value proportional to the integral of the photoelectric current.

Now that the potential at the node "a" is lower than the direct-current voltage VPD, the MOS transistor T2 is on. As a result, a current corresponding to the gate voltage of the MOS transistor T2 flows through the MOS transistor T2 as its drain current, and thus electric charge proportional to the gate voltage of the MOS transistor T2 is accumulated in the capacitor C. Accordingly, the voltage at the node "a" has the value proportional to the integral of the photoelectric current. Next, the pulse signal φV is fed to the gate of the MOS transistor T5 to turn this MOS transistor T5 on, so that the electric charge accumulated in the capacitor C is fed as the output current to the output signal line 6. This output current has the value obtained by converting the integral of the photoelectric current on a linear basis.

In this way, it is possible to read a signal (output current) that is proportional to the amount of incident light. Thereafter, the MOS transistor T5 is turned off, and the signal φD is turned to a low level, so that the electric charge accumulated in the capacitor C is discharged through the MOS transistor T2 to the signal line of the signal φD, and thereby the potential at the capacitor C, and thus at the node "a", is initialized. Thereafter, a high level is fed as the signal φVRS to the gate of the MOS transistor T3 to turn this MOS transistor T3 on so as to initialize the photodiode PD, the drain voltage of the MOS transistor T1, and the gate voltage of the MOS transistors T1 and T2. By repeating this sequence of operations at regular time intervals, it is possible to shoot continuously an ever-changing subject image with a satisfactory S/N ratio.

As described above, in this embodiment, simple manipulation of potentials makes it possible to switch the output characteristics of a single pixel among a plurality of patterns of output characteristics. When the conversion mode is switched from logarithmic conversion to linear conversion, it is preferable to switch the output first by adjusting the potential of the signal φVPS and then make the MOS transistor T3 reset the MOS transistor T1 and others. On the other hand, when the conversion mode is switched from linear conversion to logarithmic conversion, it is not necessary to make the MOS transistor T3 reset the MOS transistor T1 and others. This is because the carriers accumulated in the MOS transistor T1 as a result of the MOS transistor T1 not really being kept in a completely off state are canceled by carriers of the opposite polarity.

The reading of the signal from each pixel may be achieved by means of a CCD (charge-coupled device). In that case, the transfer of electric charge to the CCD is achieved by providing a potential barrier with a variable potential that corresponds to the MOS transistor T5 shown in FIG. 2.

<Second Example of the Pixel Configuration>

Figure 4:
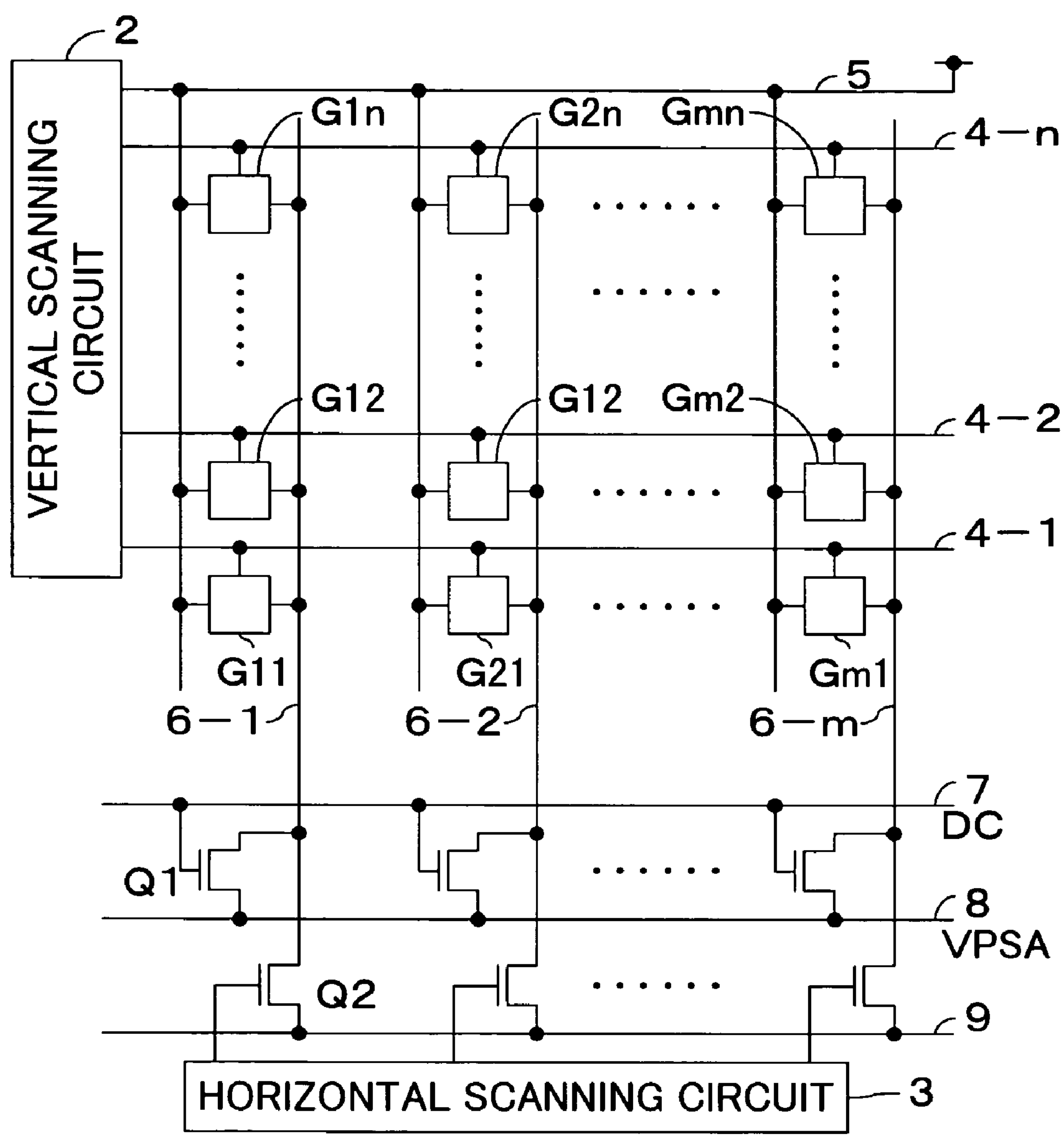
FIG. 4 is a block diagram illustrating the overall configuration of another two-dimensional photoelectric converting device embodying the invention.

FIG. 4 schematically shows the configuration of part of another two-dimensional MOS-type photoelectric converting device embodying the invention. In this figure, reference symbols G11 to Gmn represent pixels that are arranged in a two-dimensional array (in a matrix). Reference numeral 2 represents a vertical scanning circuit, which scans lines (rows) 4-1, 4-2, . . . , 4-n sequentially. Reference numeral 3 represents a horizontal scanning circuit, which reads out, sequentially pixel by pixel in a horizontal direction, the signals fed from the individual pixels to output signal lines 6-1, 6-2, . . . , 6-m as a result of photoelectric conversion performed in those pixels. Reference numeral 5 represents a power line. The individual pixels are connected not only to the lines 4-1, 4-2, . . . , 4-n, to the output signal lines 6-1, 6-2, . . . , 6-m, and to the power line 5 mentioned above, but also to other lines (for example clock lines and bias supply lines). These other lines, however, are omitted in FIG. 4, and are shown in individual embodiments of the invention shown in FIG. 6 and the following figures.

As shown in FIG. 4, for each of the output signal lines 6-1, 6-2, . . . , 6-m, a pair of N-channel MOS transistors Q1 and Q2 is provided. Here, a description will be given only with respect to the output signal line 6-1 as their representative. The MOS transistor Q1 has its gate connected to a direct-current voltage line 7, has its drain connected to the output signal line 6-1, and has its source connected to a direct-current voltage VPSA line. On the other hand, the MOS transistor Q2 has its drain connected to the output signal line 6-1, has its source connected to a signal line 9 serving as a final destination line, and has its gate connected to the horizontal scanning circuit 3.

Figure 5A:
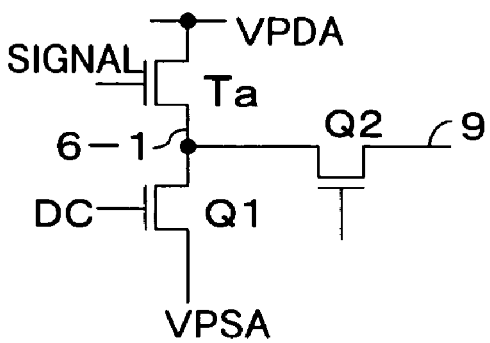
FIGS. 5A and 5B are circuit diagrams of portions of the circuit shown in FIG. 4.

As will be described later, the pixels G11 to Gmn are each provided with an N-channel MOS transistor Ta that outputs a signal in accordance with the photoelectric charge generated in each pixel. How this MOS transistor Ta is connected to the above-mentioned MOS transistor Q1 is shown in FIG. 5A. This MOS transistor Ta corresponds to a fourth MOS transistor T4 in the second, third, sixth, seventh, fourteenth, and fifteenth embodiments, and corresponds to a second MOS transistor T2 in the fourth, fifth, eighth to thirteenth, and sixteenth embodiments. Here, the direct-current voltage VPSA connected to the source of the MOS transistor Q1 and the direct-current voltage VPDA connected to the drain of the MOS transistor Ta fulfill the relation VPDA>VPSA, where the direct-current voltage VPSA is equal to, for example, the ground-level voltage. In this circuit configuration, the signal from a pixel is fed to the gate of the upper-stage MOS transistor Ta, and a direct-current voltage DC is kept applied to the gate of the lower-stage MOS transistor Q1. Thus, the lower-stage MOS transistor Q1 is equivalent to a resistor or constant-current source, and therefore the circuit shown in FIG. 5A forms an amplifier circuit of a source-follower type. Here, it can safely be assumed that, as a result of amplification, the MOS transistor Ta outputs a current.

Figure 5B:
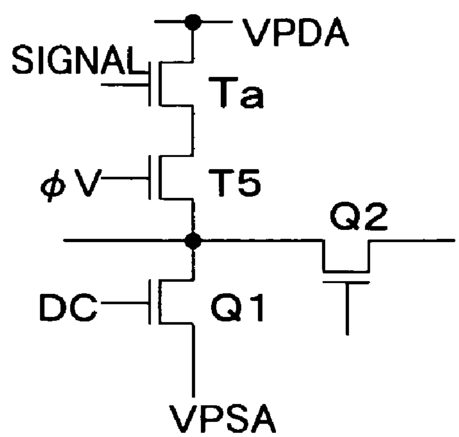

The MOS transistor Q2 is controlled by the horizontal scanning circuit 3 so as to function as a switching device. As will be described later, in all of the embodiments of the invention shown in FIG. 6 and the following figures, within each pixel, another, i.e. a fifth, N-channel MOS transistor T5 functioning as a switch is provided. If this fifth MOS transistor T5 is illustrated explicitly, the circuit shown in FIG. 5A has, more precisely, a circuit configuration as shown in FIG. 5B. Specifically, the MOS transistor T5 is inserted between the MOS transistor Q1 and the MOS transistor Ta. Here, the MOS transistor T5 serves to select a row, and the MOS transistor Q2 serves to select a column.

It is to be noted that the circuit configurations shown in FIGS. 4, 5A, and 5B are common to the second to sixteenth embodiments of the invention described hereafter.

The circuit configuration shown in FIGS. 5A and 5B permits the signal to be output with a high gain. Accordingly, even in a case where the photoelectric current generated in a photosensitive element is converted in a natural-logarithm basis to obtain a wider dynamic range and thus the output signal obtained is comparatively low, this amplifier circuit amplifies the signal so as to make it sufficiently high and thus easier to process in the succeeding signal processing circuit (not shown). Here, the MOS transistor Q1 that serves as the load resistor of the amplifier circuit is provided within each pixel; however, such transistors may be provided, instead, one for each of the output signal lines 6-1, 6-2, . . . , 6-m, i.e. one for each of the groups of pixels that individually constitute columns, with the pixels constituting each column collectively connected to one of the output signal lines 6-1, 6-2, . . . , 6-m. This helps reduce the number of load resistors or constant-current sources required, and thus reduce the area occupied by the amplifying circuits on a semiconductor chip.

Second Embodiment

Figure 6:
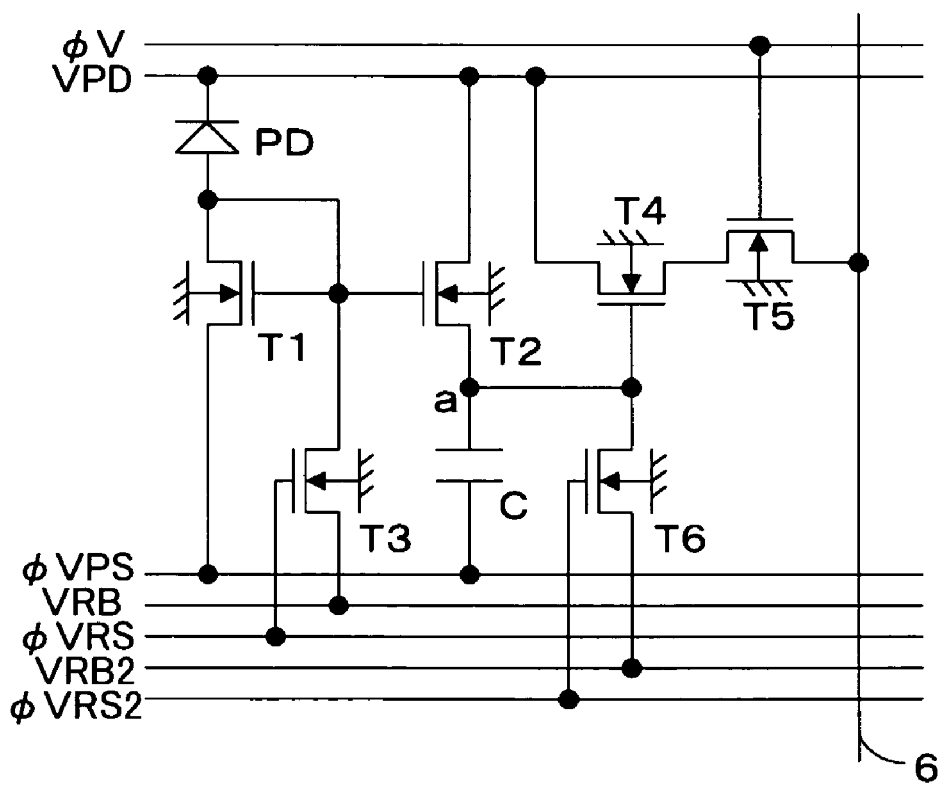
FIG. 6 is a circuit diagram showing the configuration of each pixel in a second embodiment of the invention.

Next, a second embodiment of the invention, which is applicable to each pixel of the second example of the pixel configuration shown in FIG. 4, will be described with reference to the drawings relevant thereto. FIG. 6 is a circuit diagram showing the configuration of each pixel of the photoelectric converting device of this embodiment. It is to be noted that such elements, signal lines, and others as are used for the same purposes here as in the pixel shown in FIG. 2 will be identified with the same reference symbols, and their detailed descriptions will be omitted.

As shown in FIG. 6, in this embodiment, as compared with the pixel shown in FIG. 2, there are provided additionally a fourth MOS transistor T4 having its gate connected to the node "a" for performing current amplification in accordance with the voltage applied to the node "a", a fifth MOS transistor T5 having its drain connected to the source of the MOS transistor T4 for row selection, a sixth MOS transistor T6 having its drain connected to the node "a" for initializing the potential at the capacitor C, and thus at the node "a". The source of the MOS transistor T5 is connected to the output signal line 6 (this output signal line 6 corresponds to the output signal lines 6-1, 6-2, . . . 6-m shown in FIG. 4). Just like the MOS transistors T1 to T3, the MOS transistors T4 to T6 are all N-channel MOS transistors, and have their back gates grounded.

A direct-current voltage VPD is applied to the drains of the MOS transistors T2 and T4, and a signal $\phi$V is fed to the gate of the MOS transistor T5. A direct-current voltage VRB2 is applied to the source of the MOS transistor T6, and a signal $\phi$VRS2 is fed to the gate of the same MOS transistor T6. In this embodiment, the MOS transistors T1 to T3 and the capacitor C operate in the same manner as in the first embodiment (FIG. 2), and thus, by switching the voltage of the signal $\phi$VPS and thereby switching the bias to the MOS transistor T1, it is possible to switch between two modes of conversion so as to allow the output signal fed to the output signal line 6 to vary either on a natural-logarithm basis or on a linear basis with respect to the photoelectric current. How conversion is achieved in these two modes will be described individually below.

(1) Mode in which the Output Signal is Produced by Converting the Photoelectric Current on a Natural-Logarithm Basis First, a description will be given of how conversion is achieved when the signal φVPS is kept at a low level to permit the MOS transistors T1 and T2 to operate in a subthreshold region. As in the first embodiment, in this mode, where the signal φVRS fed to the gate of the MOS transistor T3 is kept at a low level, the MOS transistor T3 remains off, and can thus be ignored as substantially absent.

When light enters the photodiode PD, a photoelectric current is generated therein, and, due to the subthreshold characteristics of MOS transistors, a voltage having the value obtained by converting the photoelectric current on a natural-logarithm basis appears at the gates of the MOS transistors T1 and T2. This voltage causes a current to flow through the MOS transistor T2, and, as a result, electric charge that is equivalent to the value obtained by converting the integral of the photoelectric current on a natural-logarithm basis is accumulated in the capacitor C. That is, a voltage proportional to the value obtained by converting the integral of the photoelectric current on a natural-logarithm basis appears at the node "a" between the capacitor C and the source of the MOS transistor T2. Here, the MOS transistors T5 and T6 remain off.

Next, the signal φV, which is a pulse signal, is fed to the gate of the MOS transistor T5 to turn this MOS transistor T5 on. This causes a current proportional to the voltage applied to the gate of the MOS transistor T4 to flow through the MOS transistors T4 and T5 to the output signal line 6. Now, the voltage applied to the gate of the MOS transistor T4 is equal to the voltage applied to the node "a", and therefore the current thus fed to the output signal line 6 has the value obtained by converting the integral of the photoelectric current on a natural-logarithm basis.

In this way, it is possible to read a signal (output current) that is proportional to the logarithm of the amount of incident light. After this signal has been read, the MOS transistor T5 is turned off, and a high level is fed as the signal φVRS2 to the gate of the MOS transistor T6, so that the MOS transistor T6 is turned on, and thereby the potential at the capacitor C, and thus at the node "a", is initialized. It is to be noted that, when the output current is so controlled as to vary on a natural-logarithm basis with respect to the amount of incident light as in this mode, the signal φVRS is kept at a low level all the time.

(2) Mode in which the Output Signal is Produced by Converting the Photoelectric Current on a Linear Basis Next, a description will be given of how conversion is achieved when the signal φVPS is kept at a high level. First, the signal φVRS fed to the gate of the MOS transistor T3 is kept at a low level, and thus this MOS transistor T3 is kept off. In addition, a high level is fed as the signal φVRS2 to the gate of the MOS transistor T6 to turn this MOS transistor T6 on and thereby reset the capacitor C, and simultaneously the potential at the node "a" is initialized to the potential VRB2, which is lower than the direct-current voltage VPD. This potential is maintained by the capacitor C. Thereafter, the signal φVRS2 is turned to a low level to turn this MOS transistor T6 off. In this state, when light enters the photodiode PD, a photoelectric current is generated therein. At this time, since capacitors exist between the back gate and the gate of the MOS transistor T1 and at the junction of the photodiode PD, the electric charge resulting from the photoelectric current is accumulated at the gate and the drain of the MOS transistor T1. Thus, the gate voltage of the MOS transistors T1 and T2 has the value proportional to the integral of the photoelectric current.

Now that the potential at the node "a" is lower than the direct-current voltage VPD, the MOS transistor T2 is on. As a result, a current corresponding to the gate voltage of the MOS transistor T2 flows through the MOS transistor T2 as its drain current, and thus electric charge proportional to the gate voltage of the MOS transistor T2 is accumulated in the capacitor C. Accordingly, the voltage at the node "a" has the value proportional to the integral of the photoelectric current. Next, the pulse signal φV is fed to the gate of the MOS transistor T5 to turn this MOS transistor T5 on, so that a current proportional to the voltage applied to the gate of the MOS transistor T4 flows through the MOS transistors T4 and T5 to the output signal line 6. Since the voltage applied to the gate of the MOS transistor T4 is equal to the voltage at the node "a", the current thus fed to the output signal line 6 has the value obtained by converting the integral of the photoelectric current on a linear basis.

In this way, it is possible to read a signal (output current) that is proportional to the amount of incident light. After this signal has been read, the MOS transistor T5 is turned off, and a high level is fed as the signal φVRS to the gate of the MOS transistor T3 to turn this MOS transistor T3 on so as to initialize the photodiode PD, the drain voltage of the MOS transistor T1, and the gate voltage of the MOS transistors T1 and T2. Next, a high level is fed as the signal φVRS2 to the gate of the MOS transistor T6 to turn this MOS transistor T6 on and thereby initialize the potential at the capacitor C, and thus at the node "a".

Third Embodiment

Figure 7:
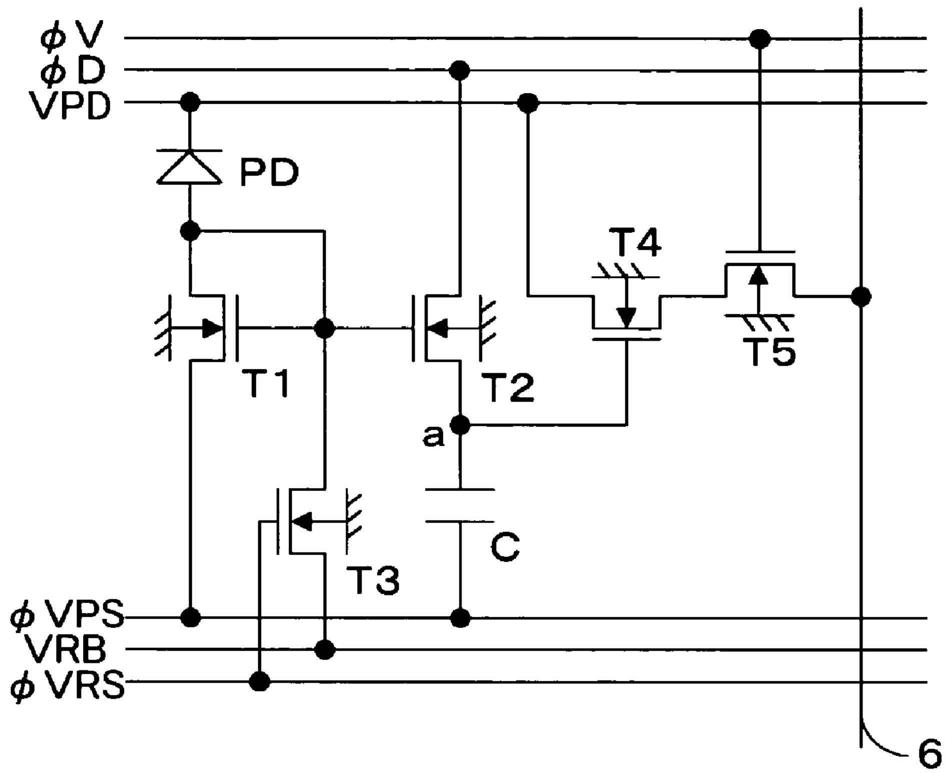
FIG. 7 is a circuit diagram showing the configuration of each pixel in a third embodiment of the invention.

Next, a third embodiment of the invention will be described with reference to the drawings relevant thereto. FIG. 7 is a circuit diagram showing the configuration of each pixel of the photoelectric converting device of this embodiment. It is to be noted that such elements, signal lines, and others as are used for the same purposes here as in the pixel shown in FIG. 6 will be identified with the same reference symbols, and their detailed descriptions will be omitted.

As shown in FIG. 7, in this embodiment, the initialization of the potential at the capacitor C, and thus at the node "a", is achieved by feeding the signal φD to the drain of the MOS transistor T2, and thus the MOS transistor T6 found in the previous embodiment is omitted. In other respects, each pixel of this embodiment is configured in the same manner as in the second embodiment (FIG. 6). Here, while the signal φD is kept at a high level, the capacitor C performs integration; while the signal φD is kept at a low level, the electric charge accumulated in the capacitor C is discharged through the MOS transistor T2 to make the voltage at the capacitor C, and thus at the gate of the MOS transistor T4, approximately equal to the low-level voltage of the signal φD, which is a clock signal (that is, the voltage is reset). In this embodiment, the omission of the MOS transistor T6 helps simplify the circuit configuration.

In this embodiment, when the output current is produced by converting the photoelectric current on a natural-logarithm basis, the MOS transistor T3 is kept off, the signal φVPS is kept at a voltage lower than the direct-current voltage VPD, and the signal φD is kept at a high level (for example, at a voltage approximately equal to the direct-current voltage VPD), so that electric charge equivalent to the value obtained by converting the integral of the photoelectric current on a natural-logarithm basis is accumulated in the capacitor C. Then, with predetermined timing, the MOS transistor T5 is turned on, so that a current proportional to the voltage applied to the gate of the MOS transistor T4 is fed through the MOS transistors T4 and T5 to the output signal line 6.

Thereafter, the MOS transistor T5 is turned off, and the signal φD is turned to a low level (to a voltage lower than the signal φVPS). As a result, the electric charge accumulated in the capacitor C flows through the MOS transistor T2 to the signal line of the signal φD, and thereby the voltage at the capacitor C, and thus at the node "a", is initialized.

By contrast, when the output current is produced by converting the photoelectric current on a linear basis, first, the MOS transistor T3 is turned off to make the voltage of the signal φVPS approximately equal to the direct-current voltage VPD, and the signal φD is turned to a high level. Prior to this, the MOS transistor T2 has been made to perform an initialization operation so as to turn the voltage at the node "a" to a voltage lower than the direct-current voltage VPD as in the second embodiment. In this state, electric charge equivalent to the value obtained by converting the integral of the photoelectric current on a linear basis is accumulated in the capacitor C. Then, with predetermined timing, the MOS transistor T5 is turned on, so that a current proportional to the voltage applied to the gate of the MOS transistor T4 is fed through the MOS transistors T4 and T5 to the output signal line 6.

Thereafter, first, the signal φD is turned to a low level, so that the electric charge accumulated in the capacitor C is discharged through the MOS transistor T2 to the signal line of the signal φD, and thereby the voltage at the node "a" is initialized to a voltage lower than the signal φVPS. Subsequently, the MOS transistor T3 is turned on so as to initialize the photodiode PD, the drain voltage of the MOS transistor T1, and the gate voltage of the MOS transistors T1 and T2.

Fourth Embodiment

Figure 8:
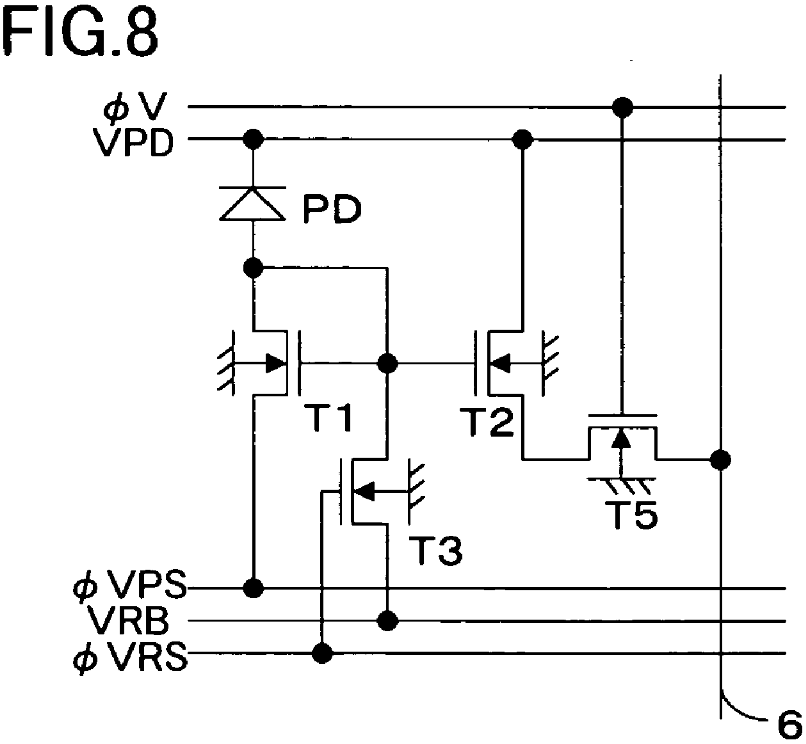
FIG. 8 is a circuit diagram showing the configuration of each pixel in a fourth embodiment of the invention.

Next, a fourth embodiment of the invention will be described with reference to the drawings relevant thereto. FIG. 8 is a circuit diagram showing the configuration of each pixel of the photoelectric converting device of this embodiment. It is to be noted that such elements, signal lines, and others as are used for the same purposes here as in the pixel shown in FIG. 7 will be identified with the same reference symbols, and their detailed descriptions will be omitted.

As shown in FIG. 8, in this embodiment, the direct-current voltage VPD is applied to the drain of the MOS transistor T2, and the capacitor C and the MOS transistor T4 found in the previous embodiment are omitted. In other respects, W each pixel of this embodiment is configured in the same manner as in the third embodiment (FIG. 7).

In this circuit configuration, as in the third embodiment, by switching the voltage of the signal φVPS and thereby switching the bias to the MOS transistor T1, it is possible to switch between two modes of conversion so as to allow the output signal fed to the output signal line 6 to vary either on a natural-logarithm basis or on a linear basis with respect to the photoelectric current.

As a result of the voltage of the signal φVPS being switched in such a way that the gate voltage of the MOS transistor T2 varies either on a natural-logarithm basis or on a linear basis with respect to the photoelectric current generated in the photodiode PD, a current having the value proportional either on a natural-logarithm basis or on a linear basis to the photoelectric current flows through the MOS transistor T2 as its drain current. Then, when the signal φV is fed to the gate of the MOS transistor T5 to turn this MOS transistor T5 on, a current having the value proportional either on a natural-logarithm basis or on a linear basis to the photoelectric current flows through the MOS transistor T5 as its drain current to the output signal line 6. At this time, the drain voltage of the MOS transistor Q1 (FIG. 4), which is determined by the on-state resistances of the MOS transistors T2 and Q1 and the current flowing therethrough, appears as the output signal on the output signal line 6. After the signal has been read in this way, the MOS transistor T5 is turned off. In a case where the signal thus read is proportional on a linear basis to the amount of incident light, after the signal has been read, the MOS transistor T3 is turned on so as to initialize the photodiode PD, the drain voltage of the MOS transistor T1, and the gate voltage of the MOS transistors T1 and T2.

In this embodiment, it is not necessary to perform integration of the photoelectric signal by the use of a capacitor C as performed in the third embodiment described above, and thus no time is required for such integration, nor is it necessary to reset the capacitor C. This ensures accordingly faster signal processing. Moreover, as compared with the third embodiment, the capacitor C and the MOS transistor T4 can be omitted, and this helps further simplify the circuit configuration and reduce the pixel size.

Fifth Embodiment

Figure 9:
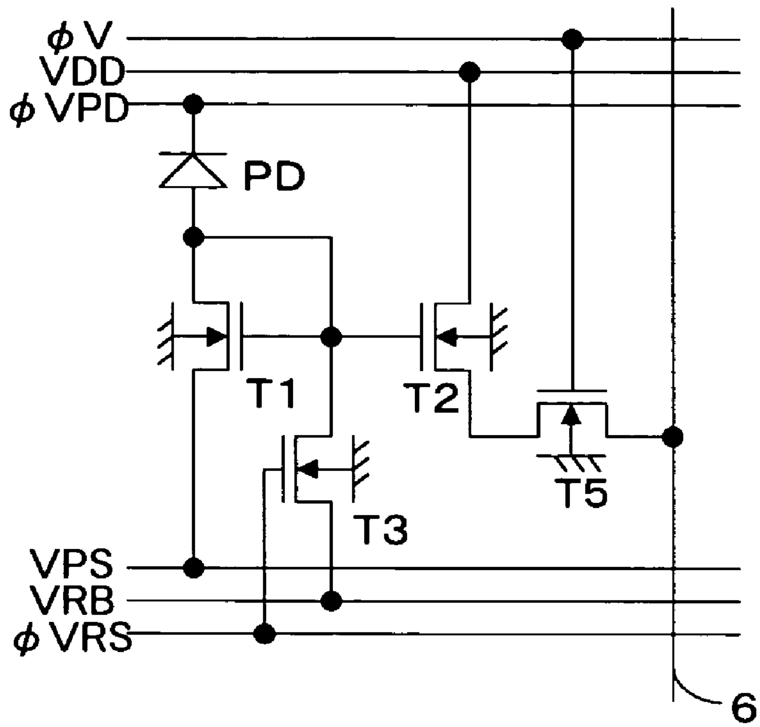
FIG. 9 is a circuit diagram showing the configuration of each pixel in a fifth embodiment of the invention.

Next, a fifth embodiment of the invention will be described with reference to the drawings relevant thereto. FIG. 9 is a circuit diagram showing the configuration of each pixel of the photoelectric converting device of this embodiment. It is to be noted that such elements, signal lines, and others as are used for the same purposes here as in the pixel shown in FIG. 8 will be identified with the same reference symbols, and their detailed descriptions will be omitted.

As shown in FIG. 9, in this embodiment, a direct-current voltage φVPD is fed to the cathode of the photodiode PD, a direct-current voltage VPS is applied to the source of the MOS transistor T1, and a direct-current voltage VDD is applied to the drain of the MOS transistor T2. In other respects, each pixel of this embodiment is configured in the same manner as in the fourth embodiment (FIG. 8).

In a pixel configured as described above, if the signal φVPD fed to the cathode of the photodiode PD is turned to a level higher than the direct-current voltage VPS so as to permit the MOS transistors T1 and T2 to operate in a threshold region, when the MOS transistor T5 is turned on, it is possible to read a signal (output current) that is proportional to the logarithm of the amount of incident light. On the other hand, if the signal φVPD fed to the cathode of the photodiode PD is turned to a level as low as the direct-current voltage VPS so as to turn the MOS transistor T5 on, it is possible to read a signal proportional to the amount of incident light.

Thus, this embodiment is different from the fourth embodiment simply in that, here, the signal φVPD and the direct-current voltage VPS are used in place of the direct-current voltage VPD and the signal φVPS, respectively, used in the fourth embodiment. Accordingly, to switch between two modes of conversion so as to allow the output signal to vary either on a natural-logarithm basis or on a linear basis with respect to the amount of incident light as described above, the level of the signal φVPD is switched in this embodiment instead of switching the level of the signal φVPS as in the fourth embodiment. In other respects, the circuit of this embodiment operates in the same manner as that of the fourth embodiment.

Sixth Embodiment

Figure 10:
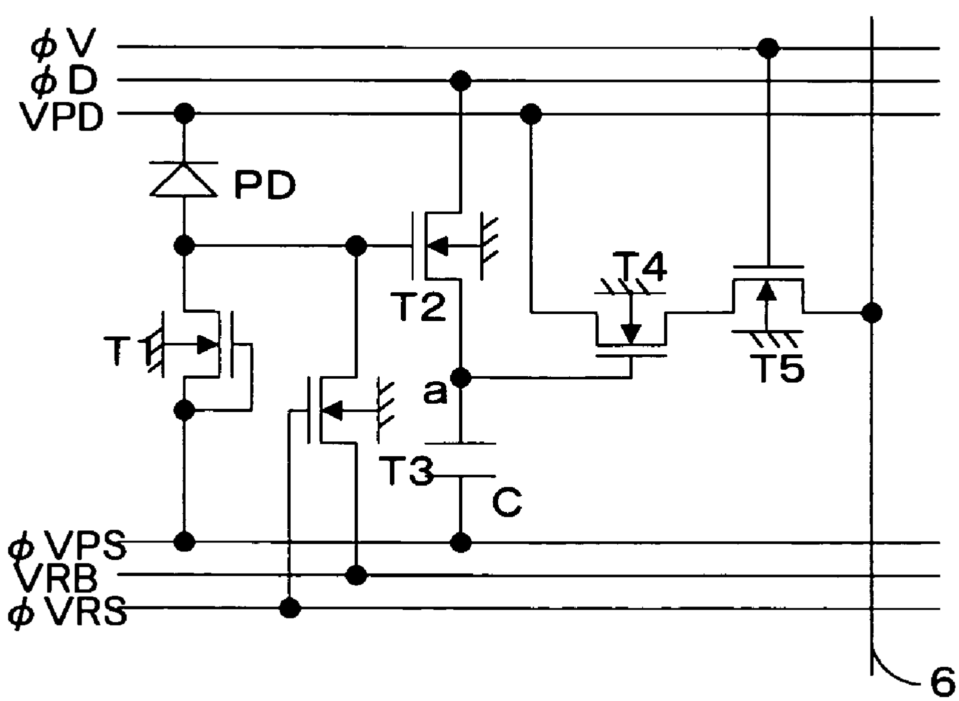
FIG. 10 is a circuit diagram showing the configuration of each pixel in a sixth embodiment of the invention.
Figure 11A:
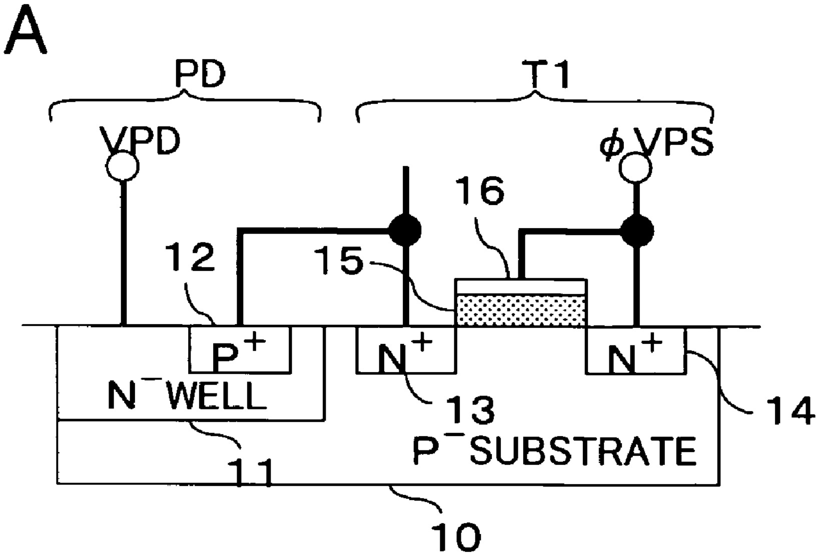
FIGS. 11A, 11B, and 11C are diagrams showing the structure of each pixel and the relationship among relevant potentials in the sixth embodiment.
Figure 11B:
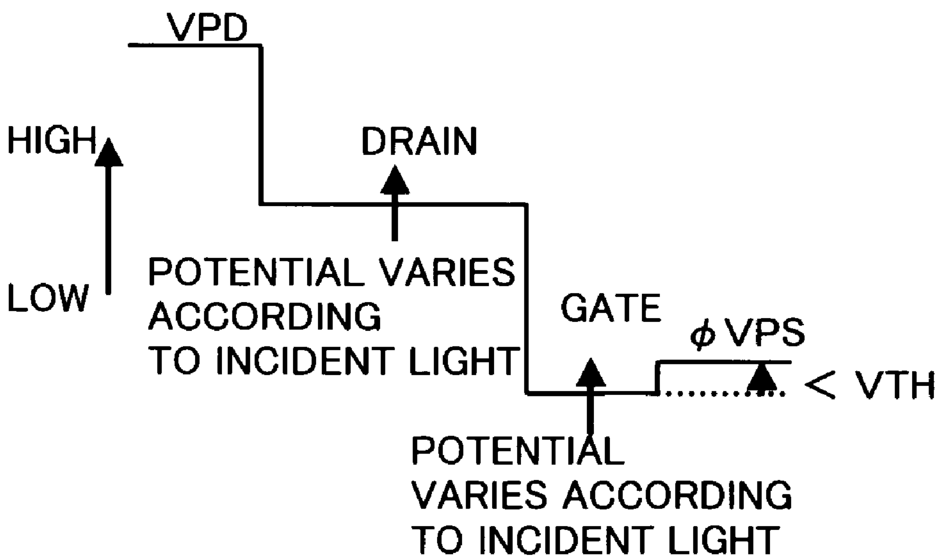
Figure 11C:
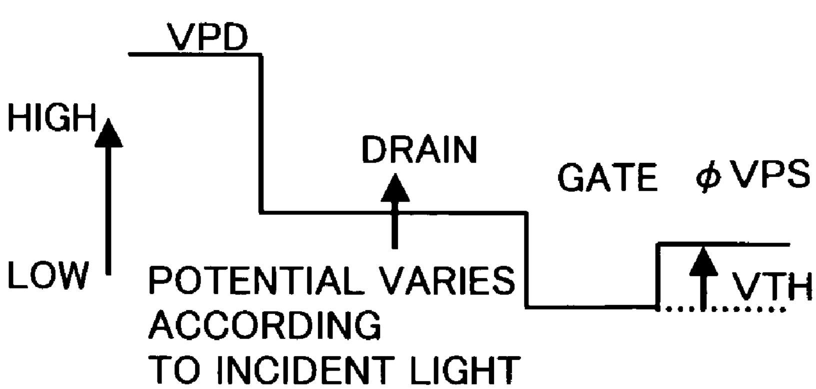

Next, a sixth embodiment of the invention will be described with reference to the drawings relevant thereto. FIG. 10 is a circuit diagram showing the configuration of each pixel of the photoelectric converting device of this embodiment. FIG. 11A is a sectional view showing the structure of the MOS transistor T1 and the photodiode PD provided within each pixel, and FIGS. 11B and 11C are diagrams showing the potentials at the source, gate, and drain of the MOS transistor T1. It is to be noted that such elements, signal lines, and others as are used for the same purposes here as in the pixel shown in FIG. 7 will be identified with the same reference symbols, and their detailed descriptions will be omitted.

As shown in FIG. 10, in this embodiment, the drain and the gate of the MOS transistor T1 are not connected together as in the third embodiment (FIG. 7), but instead the source and the gate thereof are connected together. How conversion is achieved in a pixel having a configuration modified in this way as compared with a pixel of the third embodiment will be described below with reference to FIGS. 10 and 11.

As shown in FIG. 11A, the photodiode PD is formed, for example, by forming an N-type well layer 11 in a P-type substrate 10 and then forming, in this N-type well layer 11, a P-type diffusion layer 12. On the other hand, the MOS transistor T1 is formed by forming N-type diffusion layers 13 and 14 in the P-type substrate 10 and then forming, on top of the channel left between those N-type diffusion layers 13 and 14, an oxide film 15 and, further on top thereof, a polysilicon layer 16. Here, the N-type well layer 11 functions as the cathode of the photodiode PD, and the P-type diffusion layer 12 functions as the anode thereof. On the other hand, the N-type diffusion layers 13 and 14 function as the drain and the source, respectively, of the MOS transistor T1, and the oxide film 15 and the polysilicon layer 16 function as the insulating film and the gate electrode, respectively, thereof.

(1) Mode in which the Output Signal is Produced by Converting the Photoelectric Current on a Natural-Logarithm Basis First, a description will be given of how conversion is achieved when the signal ϕVPS is kept at a level sufficiently low relative to the direct-current voltage VPD. By so doing, the voltage difference between the source and the drain of the MOS transistor T1 is made larger, and thus the voltage between the gate and the source thereof is made lower than the threshold voltage VTH. By so doing, the MOS transistor T1 is brought into the same state as when it is so biased as to operate in a subthreshold region. Accordingly, when light enters the photodiode PD and a photoelectric current is generated therein, due to the subthreshold characteristics of a MOS transistor, just as described earlier in connection with the first embodiment, a voltage having the value obtained by converting the photoelectric current on a natural-logarithm basis appears at the first electrode (here, the drain) of the MOS transistor T1.

Thereafter, conversion proceeds in the same manner as in the third embodiment (FIG. 7). Specifically, electric charge equivalent to the value obtained by converting the photoelectric current on a natural-logarithm basis is accumulated in the capacitor C. In this state, when the MOS transistor T5 is turned on, a current proportional to the electric charge accumulated in the capacitor C flows through the MOS transistors T4 and T5 to the output signal line 6. In this way, it is possible to read a signal (output current) that is proportional to the logarithm of the amount of incident light. Thereafter, the MOS transistor T5 is turned off, and the signal ϕD is turned to a low level, so that the electric charge accumulated in the capacitor C is discharged through the MOS transistor T2 to the signal line of the signal ϕD, and thereby the voltage at the capacitor C, and thus at the node "a", is initialized. When the output current is so controlled as to vary on a natural-logarithm basis with respect to the amount of incident light as in this mode, the signal ϕVRS is kept at a low level all the time, and the MOS transistor T3 is kept off.

(2) Mode in which the Output Signal is Produced by Converting the Photoelectric Current on a Linear Basis Next, a description will be given of how conversion is achieved when the signal ϕVPS is kept at a level somewhat lower than the direct-current voltage VPD. In this state, the potentials at the source, gate, and drain of the MOS transistor T1 have a relationship as shown in FIG. 11C, and thus the MOS transistor T1 is kept substantially in an cut-off state. Accordingly, no current flows through the channel between the source and the drain of the MOS transistor T1. On the other hand, the signal ϕVRS fed to the gate of the MOS transistor T3 is kept at a low level, and thus the MOS transistor T3 is kept off.

First, a low level is fed as the signal ϕD to the drain of the MOS transistor T2, so that, as in the third embodiment (FIG. 7), the capacitor C is reset and the potential at the node "a" is turned to a potential lower than the direct-current voltage VPD. Thereafter, the signal ϕD is turned to a high level. Thereafter, conversion proceeds in the same manner as in the third embodiment. Specifically, when light enters the photodiode PD and a photoelectric current is generated therein, since capacitors exist between the back gate and the gate of the MOS transistor T1 and at the junction of the photodiode PD, the electric charge resulting from the photoelectric current is accumulated mainly at the gates of the MOS transistors T1 and T2. Accordingly, the gate voltage of the MOS transistors T1 and T2 has the value proportional to the integral of the photoelectric current.

Now that the potential at the node "a" is lower than the direct-current voltage VPD, the MOS transistor T2 is on. As a result, a current corresponding to the gate voltage of the MOS transistor T2 flows through the MOS transistor T2 as its drain current, and thus electric charge proportional to the gate voltage of the MOS transistor T2 is accumulated in the capacitor C. Accordingly, the voltage at the node "a" has the value proportional to the integral of the photoelectric current. Then, when the pulse signal ϕV is fed to the gate of the MOS transistor T5 to turn this MOS transistor T5 on, a current proportional to the voltage applied to the gate of the MOS transistor T4 flows through the MOS transistors T4 and T5 to the output signal line 6.

In this way, it is possible to read from a pixel a signal (output current) that is proportional to the amount of incident light. After this signal has been read, first, the MOS transistor T5 is turned off, and a high level is fed as the signal ϕVRS to the gate of the MOS transistor T3 to turn this MOS transistor T3 on and thereby initialize the photodiode PD, the drain voltage of the MOS transistor T1, and the gate voltage of the MOS transistor T2. Next, a low level is fed as the signal ϕD to the drain of the MOS transistor T2, so that the electric charge accumulated in the capacitor C is discharged through the MOS transistor T2, and thereby the potential at the capacitor C, and thus at the node "a", is initialized.

Seventh Embodiment

Figure 12:
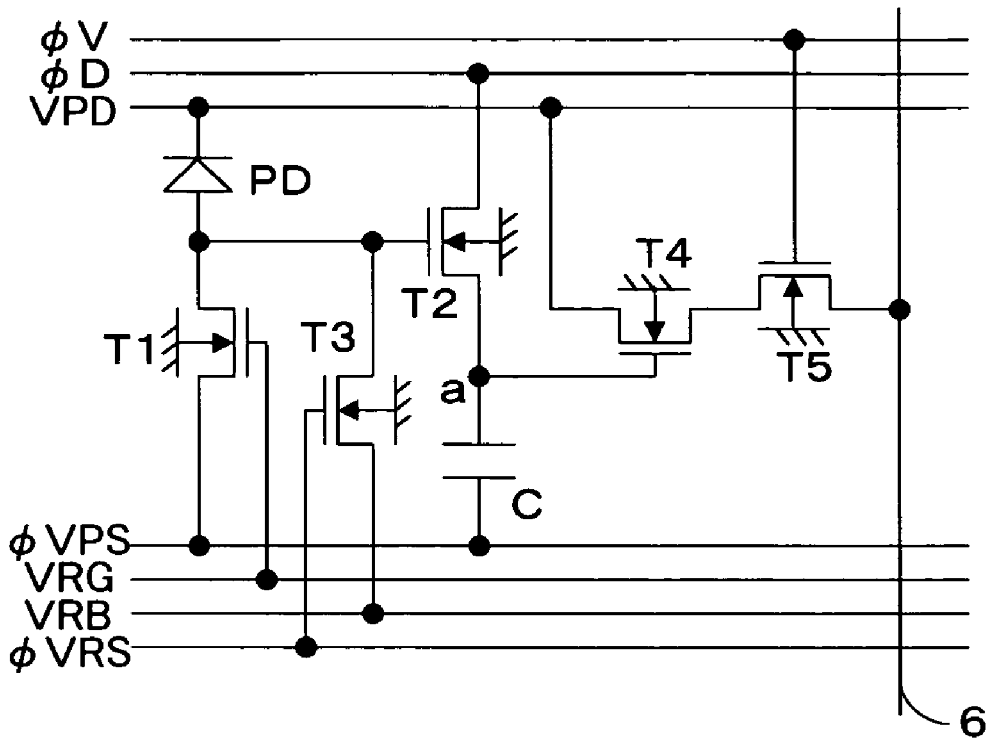
FIG. 12 is a circuit diagram showing the configuration of each pixel in a seventh embodiment of the invention.

Next, a seventh embodiment of the invention will be described with reference to the drawings relevant thereto. FIG. 12 is a circuit diagram showing the configuration of each pixel of the photoelectric converting device of this embodiment. It is to be noted that such elements, signal lines, and others as are used for the same purposes here as in the pixel shown in FIG. 10 will be identified with the same reference symbols, and their detailed descriptions will be omitted.

As shown in FIG. 12, in this embodiment, a direct-current voltage VRG is applied to the gate of the MOS transistor T1. Here, for example by adjusting, in advance, this direct-current voltage VRG to be somewhat higher than the signal φVPS, the voltage difference between the source of the MOS transistor T1 and the cathode of the photodiode PD is made smaller. By so doing, even in the mode in which the MOS transistor T1 is made to operate in a subthreshold region, it is not necessary to set the voltage of the signal φVPS to be extremely low relative to the direct-current voltage VPD as in the sixth embodiment in order to bring the MOS transistor T1 into a state in which it exhibits potentials as shown in FIG. 11B described previously. Thus, as compared with the sixth embodiment, the difference between the voltage of the signal φVPS when it is at a high level and its voltage when it is at a low level is smaller. In this embodiment, conversion is achieved in the same manner as in the sixth embodiment (FIG. 10) to output a signal (output current) that is proportional either on a linear basis or on a natural-logarithm basis to the amount of incident light, and therefore no detailed description thereof will be given.

Eighth Embodiment

Figure 13:
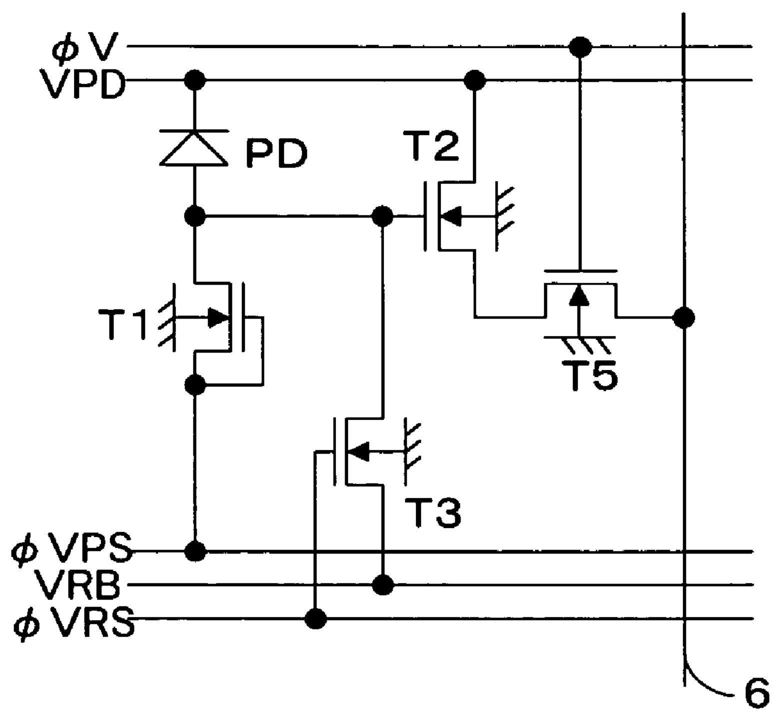
FIG. 13 is a circuit diagram showing the configuration of each pixel in a eighth embodiment of the invention.

Next, an eighth embodiment of the invention will be described with reference to the drawings relevant thereto. FIG. 13 is a circuit diagram showing the configuration of each pixel of the photoelectric converting device of this embodiment. It is to be noted that such elements, signal lines, and others as are used for the same purposes here as in the pixel shown in FIG. 10 will be identified with the same reference symbols, and their detailed descriptions will be omitted.

As shown in FIG. 13, in this embodiment, a direct-current voltage VPD is applied to the drain of the MOS transistor T2, and the capacitor C and the MOS transistor T4 found in the sixth embodiment (FIG. 10) are omitted. In other respects, each pixel of this embodiment is configured in the same manner as in the sixth embodiment.

Thus, the configuration of this embodiment is to that of the sixth embodiment what the configuration of the fourth embodiment (FIG. 8) is to that of the third embodiment (FIG. 7). Accordingly, the photodiode PD and the MOS transistors T1 to T3 here operate in the same manner as the photodiode PD and the MOS transistors T1 to T3 in the sixth embodiment, and the MOS transistors T3 and T5 here operate in the same manner as the MOS transistors T3 and T5 in the fourth embodiment.

Ninth Embodiment

Figure 14:
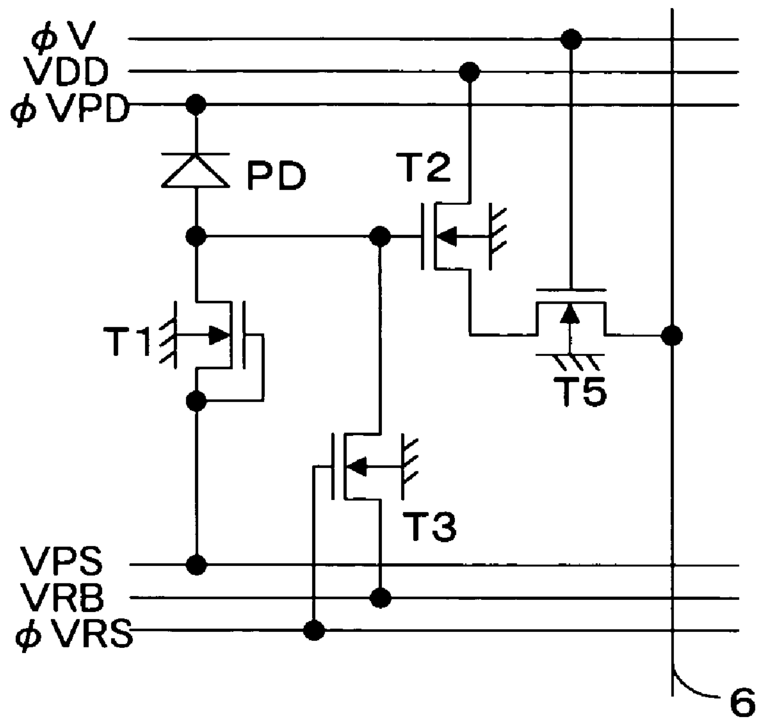
FIG. 14 is a circuit diagram showing the configuration of each pixel in a ninth embodiment of the invention.

Next, a ninth embodiment of the invention will be described with reference to the drawings relevant thereto. FIG. 14 is a circuit diagram showing the configuration of each pixel of the photoelectric converting device of this embodiment. It is to be noted that such elements, signal lines, and others as are used for the same purposes here as in the pixel shown in FIG. 13 will be identified with the same reference symbols, and their detailed descriptions will be omitted.

As shown in FIG. 14, in this embodiment, the signal φVPD is fed to the cathode of the photodiode PD, the direct-current voltage VPS is applied to the source of the MOS transistor T1, and the direct-current voltage VDD is applied to the drain of the MOS transistor T2. The configuration of this embodiment is to that of the eighth embodiment (FIG. 13) what the configuration of the fifth embodiment (FIG. 9) is to that of the fourth embodiment (FIG. 8). Accordingly, by keeping the signal φVPD fed to the cathode of the photodiode PD at a high level that is sufficiently high relative to the direct-current voltage VPS, the MOS transistors T1 and T2 are made to operate in a subthreshold region. In this state, by turning the MOS transistor T5 on, it is possible to read a signal (output current) that is proportional to the logarithm of the amount of incident light. On the other hand, by keeping the signal φVPD fed to the cathode of the photodiode PD at a low level that is somewhat higher than the direct-current voltage VPS, electric charge is accumulated at the gate and the drain of the MOS transistor T1. In this state, by turning the MOS transistor T5 on, it is possible to read a signal that is proportional to the amount of incident light.

Tenth Embodiment

Figure 15:
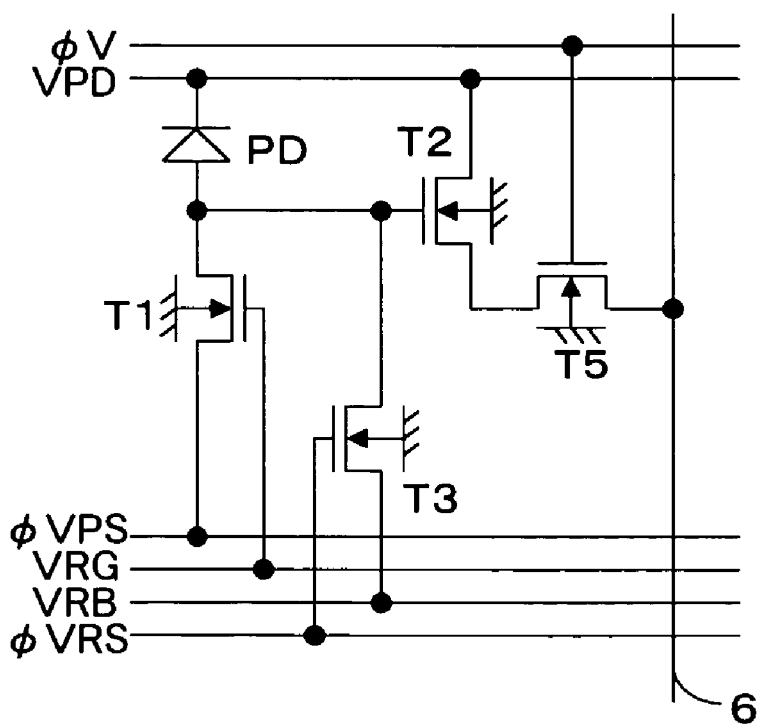
FIG. 15 is a circuit diagram showing the configuration of each pixel in a tenth embodiment of the invention.

Next, a tenth embodiment of the invention will be described with reference to the drawings relevant thereto. FIG. 15 is a circuit diagram showing the configuration of each pixel of the photoelectric converting device of this embodiment. It is to be noted that such elements, signal lines, and others as are used for the same purposes here as in the pixel shown in FIG. 12 will be identified with the same reference symbols, and their detailed descriptions will be omitted.

As shown in FIG. 15, in this embodiment, the direct-current voltage VPD is applied to the drain of the MOS transistor T2, and the capacitor C and the MOS transistor T4 found in the seventh embodiment (FIG. 12) are omitted. In other respects, each pixel of this embodiment is configured in the same manner as in the seventh embodiment.

Thus, the configuration of this embodiment is to that of the seventh embodiment what the configuration of the fourth embodiment (FIG. 8) is to that of the third embodiment (FIG. 7). Accordingly, the photodiode PD and the MOS transistors T1 to T3 here operate in the same manner as the photodiode PD and the MOS transistors T1 to T3 in the seventh embodiment, and the MOS transistors T3 and T5 here operate in the same manner as the MOS transistors T3 and T5 in the fourth embodiment.

Eleventh Embodiment

Figure 16:
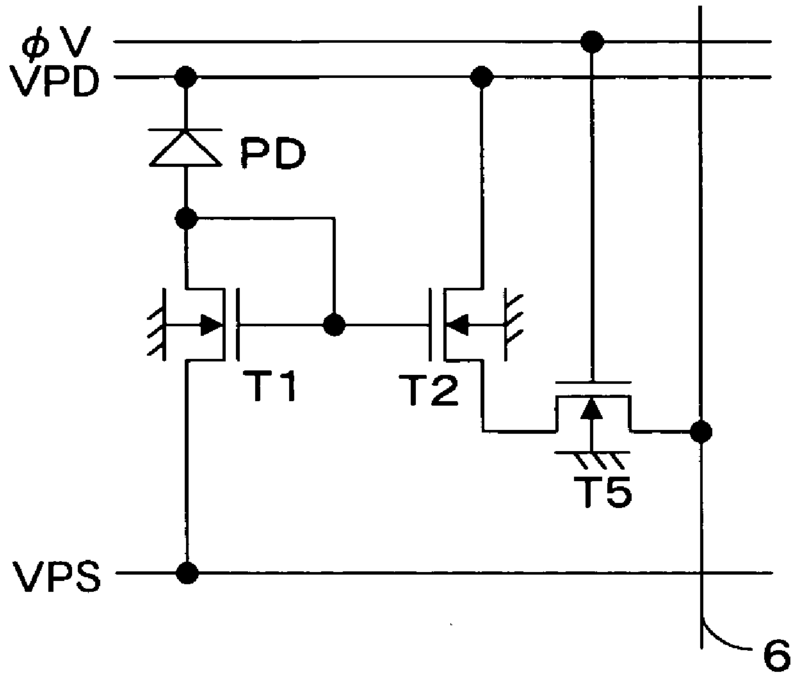
FIG. 16 is a circuit diagram showing the configuration of each pixel in a eleventh embodiment of the invention.

Next, an eleventh embodiment of the invention will be described with reference to the drawings relevant thereto. FIG. 16 is a circuit diagram showing the configuration of each pixel of the photoelectric converting device of this embodiment. It is to be noted that such elements, signal lines, and others as are used for the same purposes here as in the pixel shown in FIG. 8 will be identified with the same reference symbols, and their detailed descriptions will be omitted.

As shown in FIG. 16, the direct-current voltage VPS is applied to the MOS transistor T1, so that the MOS transistor T1 is so biased as to operate in a subthreshold region. Moreover, as compared with the fourth embodiment (FIG. 8), the MOS transistor T3 is omitted that is used to reset the photodiode PD, the drain of the MOS transistor T1, and the gates of the MOS transistors T1 and T2 in the mode in which the output signal is produced by converting the amount of light striking the photodiode PD on a linear basis.

Twelfth Embodiment

Figure 17:
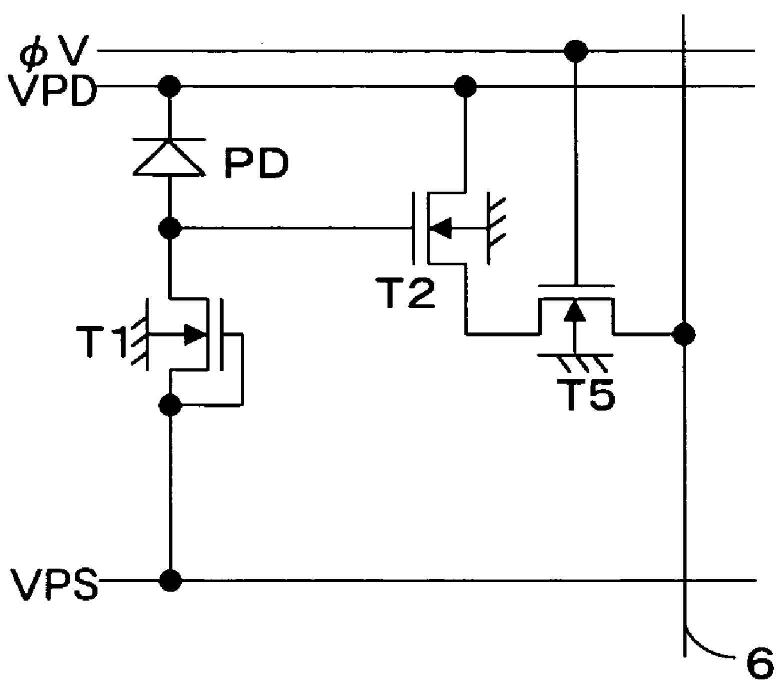
FIG. 17 is a circuit diagram showing the configuration of each pixel in a twelfth embodiment of the invention.

Next, a twelfth embodiment of the invention will be described with reference to the drawings relevant thereto. FIG. 17 is a circuit diagram showing the configuration of each pixel of the photoelectric converting device of this embodiment. It is to be noted that such elements, signal lines, and others as are used for the same purposes here as in the pixel shown in FIG. 13 will be identified with the same reference symbols, and their detailed descriptions will be omitted.

As shown in FIG. 17, the direct-current voltage VPS is applied to the MOS transistor T1, so that the MOS transistor T1 is so biased as to operate in a subthreshold region. Moreover, as compared with the eighth embodiment (FIG. 13), the MOS transistor T3 is omitted that is used to reset the photodiode PD, the drain of the MOS transistor T1, and the gate of the MOS transistor T2 in the mode in which the output signal is produced by converting the amount of light striking the photodiode PD on a linear basis.

Thirteenth Embodiment

Figure 18:
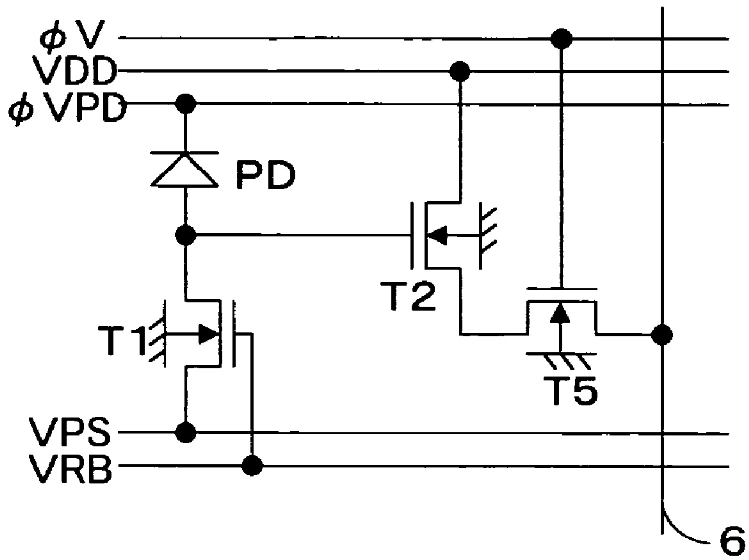
FIG. 18 is a circuit diagram showing the configuration of each pixel in a thirteenth embodiment of the invention.

Next, a thirteenth embodiment of the invention will be described with reference to the drawings relevant thereto. FIG. 18 is a circuit diagram showing the configuration of each pixel of the photoelectric converting device of this embodiment. It is to be noted that such elements, signal lines, and others as are used for the same purposes here as in the pixel shown in FIG. 15 will be identified with the same reference symbols, and their detailed descriptions will be omitted.

As shown in FIG. 18, the direct-current voltage VPS is applied to the MOS transistor T1, so that the MOS transistor T1 is so biased as to operate in a subthreshold region. Moreover, as compared with the tenth embodiment (FIG. 15), the MOS transistor T3 is omitted that is used to reset the photodiode PD, the drain of the MOS transistor T1, and the gate of the MOS transistor T2 in the mode in which the output signal is produced by converting the amount of light striking the photodiode PD on a linear basis.

Fourteenth Embodiment

Figure 19:
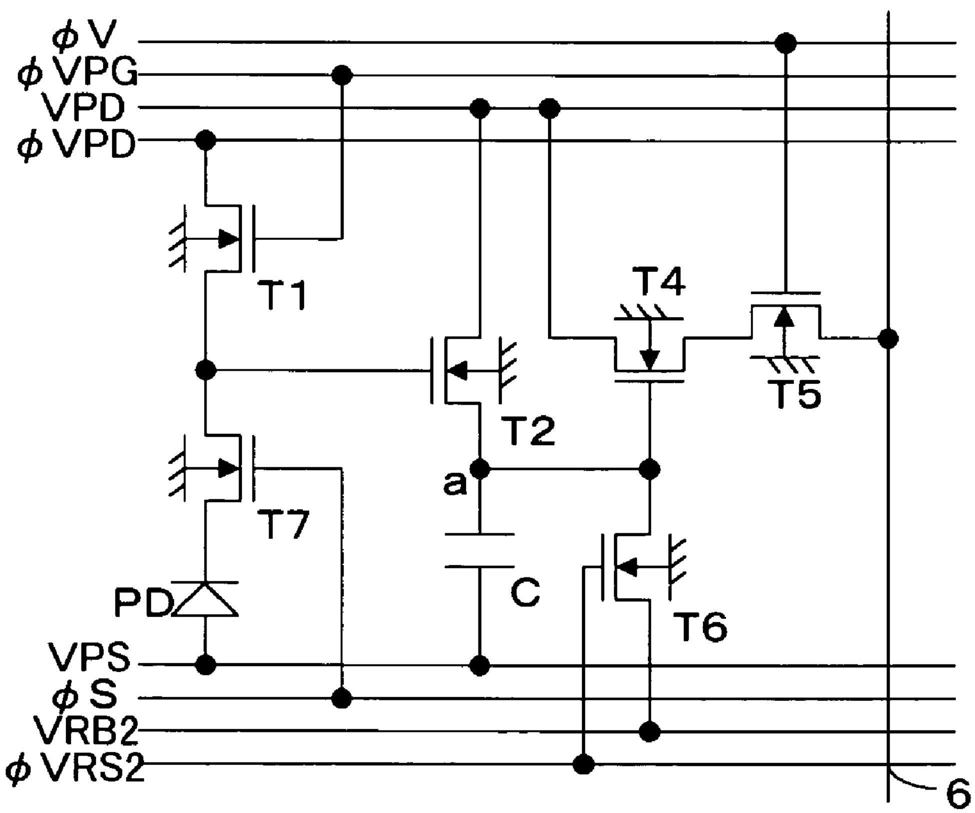
FIG. 19 is a circuit diagram showing the configuration of each pixel in a fourteenth embodiment of the invention.

Next, a fourteenth embodiment of the invention will be described with reference to the drawings relevant thereto. FIG. 19 is a circuit diagram showing the configuration of each pixel of the photoelectric converting device of this embodiment. It is to be noted that such elements, signal lines, and others as are used for the same purposes here as in the pixel shown in FIG. 6 will be identified with the same reference symbols, and their detailed descriptions will be omitted.

As shown in FIG. 19, in this embodiment, the MOS transistors T2, T4, T5, and T6 and the capacitor C that constitute an output block of a pixel are configured in the same manner as in the pixel shown in FIG. 6. In this pixel configured as shown in FIG. 19, a direct-current voltage VPS is applied to the anode of the photodiode PD and to one end of the capacitor C, and the signal φVPD is applied to the drain of the MOS transistor T1, whose source is connected to the gate of the MOS transistor T2. In addition, a seventh MOS transistor T7 is provided that has its drain connected to the source of the MOS transistor T1 and has its source connected to the cathode of the photodiode PD. Moreover, a signal φVPG is fed to the gate of the MOS transistor T1, and a signal φS is fed to the gate of the MOS transistor T7.

(1) Mode in which the Output Signal is Produced by Converting the Photoelectric Current on a Natural-Logarithm Basis Here, a first voltage is used to permit the MOS transistor T1 to operate in a subthreshold region, and a second voltage that is approximately equal to the direct-current voltage VPS is used to permit pixel-to-pixel variations in the threshold level of the MOS transistor T1 to be detected.

(1-a) Image Shooting Operation

The signal φVPD is made equal to the first voltage to permit the MOS transistor T1 to operate in a subthreshold region, and the signal φS fed to the gate of the MOS transistor T7 is turned to a high level to turn this MOS transistor T7 on. In this state, when light enters the photodiode PD, a photoelectric current is generated therein, and thus, due to the subthreshold characteristics of a MOS transistor, a voltage having the value obtained by converting the photoelectric current on a natural-logarithm basis appears at the source of the MOS transistor T1 and at the gate of the MOS transistor T2. Here, since negative photoelectric charge is generated in the photodiode PD and flows into the source of the MOS transistor T1, the more intense the incident light, the lower the source voltage of the MOS transistor T1 becomes.

When a voltage obtained by converting the photoelectric current on a natural-logarithm basis appears at the gate of the MOS transistor T2 in this way, first, a high level is fed as the signal φVRS2 to the gate of the MOS transistor T6 to turn this MOS transistor T6 on so as to reset the voltage at the capacitor C, and thus at the node "a". At this time, the voltage at the node "a" is reset to a voltage lower than the surface potential that is determined by the gate voltage of the MOS transistor T2 in order to allow the MOS transistor T2 to operate. Next, the signal φVRS2 is turned to a low level to turn the MOS transistor T6 off, and then the signal φV is turned to a high level to turn the MOS transistor T5 on.

Here, as a result of the MOS transistor T6 resetting the voltage at the node "a", the MOS transistor T2 operates in such a way that a voltage obtained by sampling the surface potential that is determined by the gate voltage of the MOS transistor T2 is fed to the gate of the MOS transistor T4. Accordingly, the voltage at the gate of the MOS transistor T4 has the value that is proportional to the logarithm of the amount of incident light, and thus, when the MOS transistor T5 is turned on, a current having the value obtained by converting the photoelectric current on a natural-logarithm basis flows through the MOS transistors T4 and T5 to the output signal line 6. In this way, a signal (output current) proportional to the logarithm of the amount of incident light is read, and thereafter the MOS transistor T5 is turned off.

(1-b) Sensitivity Variation Detection

Figure 20:
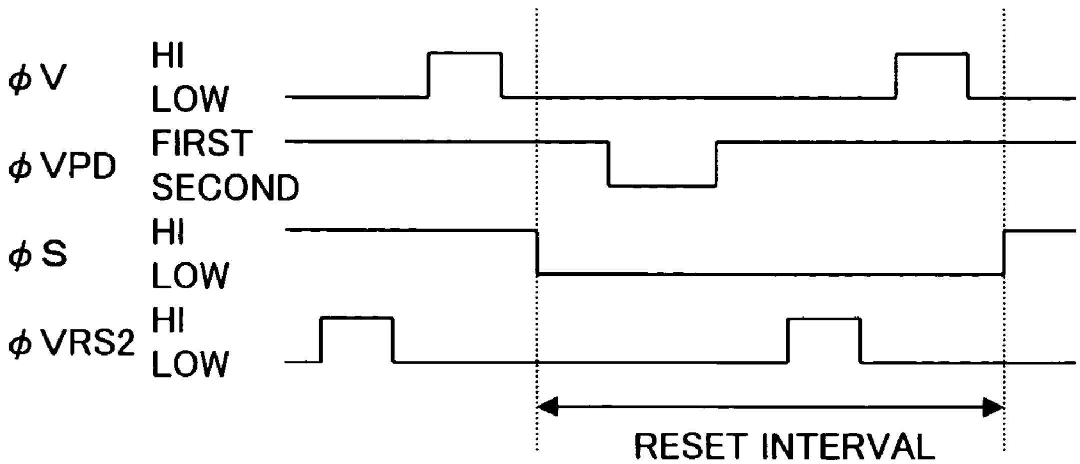
FIG. 20 is a timing chart of the signals fed to the elements constituting a pixel in the fourteenth embodiment.

FIG. 20 shows a timing chart of relevant signals as observed when variations in sensitivity among the individual pixels are detected. As described above, by feeding the pulse signal φVRS2 to the gate of the MOS transistor T6, the voltage at the node "a" is reset, and then, by feeding the pulse signal φV to the gate of the MOS transistor T5, an output signal is read. Thereafter, first, the signal ϕS is turned to a low level to turn the MOS transistor T7 off. Then, the signal ϕVPD is made equal to the second voltage to accumulate negative electric charge between the drain and the source of the MOS transistor T1.

Next, when the signal ϕVPD is turned back to the first voltage, part of the accumulated negative electric charge flows into the signal line of the signal ϕVPD, and the rest of the negative electric charge remains at the source of the MOS transistor T1. Here, the amount of negative electric charge that remains depends on the threshold voltage between the gate and the source. After the negative electric charge has been accumulated at the source of the MOS transistor T1 in this way, the pulse signal ϕVRS2 is fed to the gate of the MOS transistor T6 to reset the voltage at the node "a", and then the pulse signal ϕV is fed to the gate of the MOS transistor T5 to read an output signal.

The output signal thus read has the value corresponding to the threshold voltage of the MOS transistor T1, and therefore, on the basis of this signal, it is possible to detect variations in sensitivity among the individual pixels. Lastly, to permit image shooting operation, the signal ϕS is turned to a high level to turn the MOS transistor T7 on. The signal thus obtained as a result of sensitivity variation detection is stored as compensation data in memory such as a line memory so that, for each pixel, the output signal obtained therefrom in actual image shooting is compensated on the basis of this compensation data. This makes it possible to remove, from the output signal, components resulting from variations among the pixels.

Figure 47:
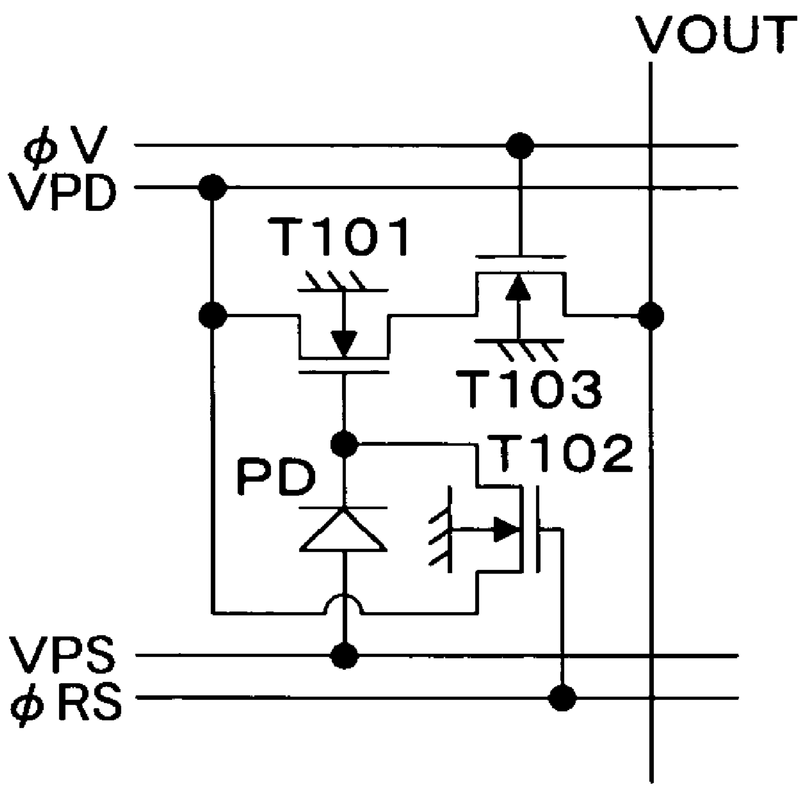
FIG. 47 is a circuit diagram showing the configuration of each pixel in a conventional photoelectric converting device.

(2) Mode in which the Output Signal is Produced by Converting the Photoelectric Current on a Linear Basis In this mode, the voltage of the signal ϕVPD is kept at a third voltage that is equal to the operation point of the MOS transistor T2 (this voltage may be equal to the first voltage mentioned previously provided that the circuit configuration is so optimized as to ensure proper operation of the MOS transistor T2). Moreover, in this mode, the signal ϕS is kept at a high level all the time, and thus the MOS transistor T7, which receives the signal ϕS at its gate, is kept on all the time. As a result, in this circuit configuration, the MOS transistor T1 corresponds to the resetting MOS transistor T102 shown in FIG. 47, and the MOS transistor T2 corresponds to the signal-amplification MOS transistor T101 shown in FIG. 47.

(2-a) Image Shooting Operation

First, the signal ϕVPG is turned to a low level to turn the resetting MOS transistor T1 off. In this state, in which the resetting MOS transistor T1 is off, when a photoelectric current is generated in the photodiode PD, the gate voltage of the MOS transistor T2 changes. Specifically, negative photoelectric charge is fed from the photodiode PD to the gate of the MOS transistor T2, and thus the gate voltage of the MOS transistor T2 has the value obtained by converting the photoelectric current on a linear basis. Here, since the negative photoelectric charge generated in the photodiode PD flows into the gate of the MOS transistor T2, the more intense the incident light, the lower the gate voltage of the MOS transistor T2 becomes.

When a voltage obtained by converting the photoelectric current on a linear basis appears at the gate of the MOS transistor T2 in this way, first, a high level is fed as the signal ϕVRS2 to the gate of the MOS transistor T6 to turn this MOS transistor T6 on so as to reset the voltage at the capacitor C, and thus at the node "a". At this time, the voltage at the node "a" is reset to a voltage lower than the surface potential that is determined by the gate voltage of the MOS transistor T2 in order to allow the MOS transistor T2 to operate. Next, the signal ϕVRS2 is turned to a low level to turn the MOS transistor T6 off, and then the signal ϕV is turned to a high level to turn the MOS transistor T5 on.

Here, as a result of the MOS transistor T6 resetting the voltage at the node "a", the MOS transistor T2 operates in such a way that a voltage obtained by sampling the surface potential that is determined by the gate voltage of the MOS transistor T2 is fed to the gate of the MOS transistor T4. Accordingly, the voltage at the gate of the MOS transistor T4 has the value that is proportional to the integral of the amount of incident light, and thus, when the MOS transistor T5 is turned on, a current having the value obtained by converting the photoelectric current on a linear basis flows through the MOS transistors T4 and T5 to the output signal line 6. In this way, a signal (output current) proportional to the amount of incident light is read, and thereafter the MOS transistor T5 is turned off.

(2-b) Resetting Operation

Figure 21:
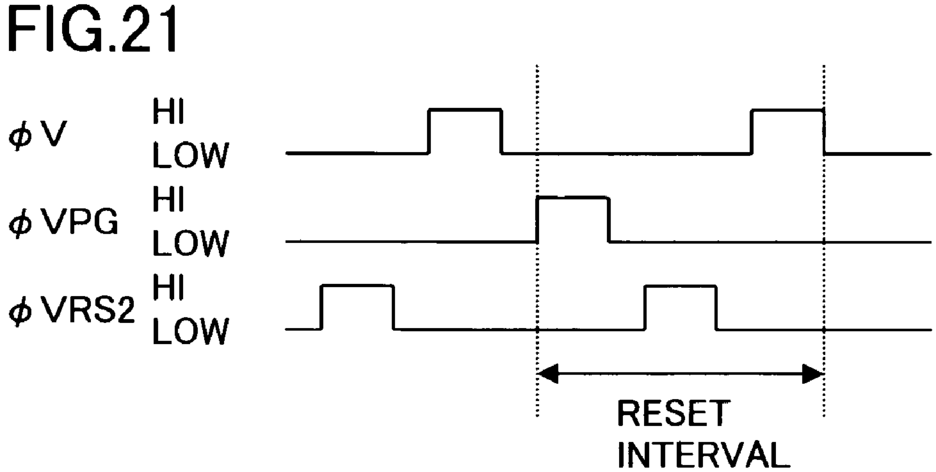
FIG. 21 is a timing chart of the signals fed to the elements constituting a pixel in the fourteenth embodiment.

FIG. 21 shows a timing chart of relevant signals as observed when each pixel is reset. As described above, by feeding the pulse signal ϕVRS2 to the gate of the MOS transistor T6, the voltage at the node "a" is reset, and then, by feeding the pulse signal ϕV to the gate of the MOS transistor T5, an output signal is read. Thereafter, first, the signal ϕVPG is turned to a high level to turn the MOS transistor Ti on. When the MOS transistor Ti is turned on in this way, the third voltage is fed to the gate of the MOS transistor T2, and thereby the gate voltage of the MOS transistor T2 is reset. Then, the signal ϕVPG is turned back to a low level to turn the MOS transistor T1 off.

Next, the pulse signal ϕVRS2 is fed to the gate of the MOS transistor T6 to reset the voltage at the node "a", and then the pulse signal ϕV is fed to the gate of the MOS transistor T5 to read an output signal. The output signal thus read has the value corresponding to the gate voltage of the MOS transistor T2, and is thus read as an output signal obtained when initialization is performed. After this output signal has been read, image shooting operation as described previously is restarted.

The signal thus obtained when initialization is performed is stored as compensation data in memory such as a line memory so that, for each pixel, the output signal obtained therefrom in actual image shooting is compensated on the basis of this compensation data. This makes it possible to remove, from the output signal, components resulting from variations among the pixels. Here, the circuit may be so configured that, as in the third embodiment (FIG. 7), a pulse signal (for example, ϕVPDA) is fed to the drain of the MOS transistor T2 to permit this MOS transistor T2 to reset the voltage at the node "a" in response to that signal ϕVPDA. This makes it possible to omit the MOS transistor T6 from a pixel configured as shown in FIG. 19.

Fifteenth Embodiment

Figure 22:
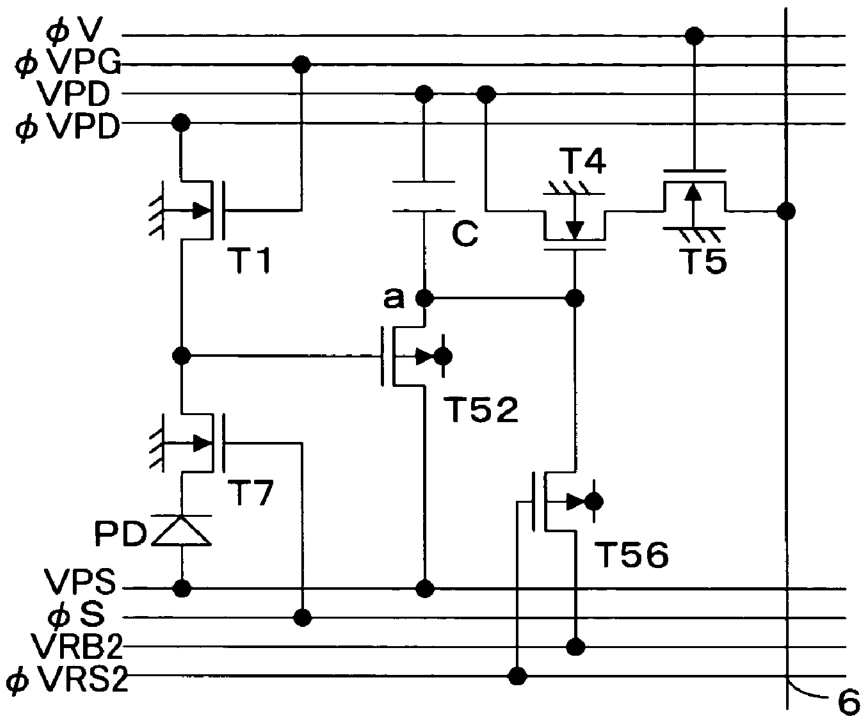
FIG. 22 is a circuit diagram showing the configuration of each pixel in a fifteenth embodiment of the invention.

Next, a fifteenth embodiment of the invention will be described with reference to the drawings relevant thereto. FIG. 22 is a circuit diagram showing the configuration of each pixel of the photoelectric converting device of this embodiment. It is to be noted that such elements, signal lines, and others as are used for the same purposes here as in the pixel shown in FIG. 19 will be identified with the same reference symbols, and their detailed descriptions will be omitted.

As shown in FIG. 22, in this embodiment, P-type MOS transistors T52 and T56 are used in place of the MOS transistors T2 and T6 used in the pixel shown in FIG. 19. The direct-current voltage VPS is applied to the drain of the MOS transistor T52, and the direct-current voltage VPD is applied to one end of the capacitor C, of which the other end is connected to the source of the MOS transistor T52. Moreover, the direct-current voltage VRB2 is applied to the drain of the MOS transistor T56, of which the source is connected to the gate of the MOS transistor T4. In other respects, each pixel of this embodiment is configured as the pixel shown in FIG. 19. Here, the direct-current voltage VRB2 applied to the source of the MOS transistor T56 is higher than the direct-current voltage VPS.

(1) Mode in which the Output Signal is Produced by Converting the Photoelectric Current on a Natural-Logarithm Basis Here, as in the fourteenth embodiment, a first voltage is used to permit the MOS transistor T1 to operate in a subthreshold region, and a second voltage that is approximately equal to the direct-current voltage VPS is used to permit pixel-to-pixel variations in the threshold level of the MOS transistor T1 to be detected.

(1-a) Image Shooting Operation

The signal φVPD is made equal to the first voltage to permit the MOS transistor T1 to operate in a subthreshold region, and the signal φS fed to the gate of the MOS transistor T7 is turned to a high level to turn this MOS transistor T7 on. Here, it is assumed that the voltage at the capacitor C, and thus at the node "a", has already been reset by the MOS transistor T56. In this state, when light enters the photodiode PD, a photoelectric current is generated therein, and thus, due to the subthreshold characteristics of a MOS transistor, a voltage having the value obtained by converting the photoelectric current on a natural-logarithm basis appears at the source of the MOS transistor T1 and at the gate of the MOS transistor T52. Here, since negative photoelectric charge is generated in the photodiode PD and flows into the source of the MOS transistor T1, the more intense the incident light, the lower the source voltage of the MOS transistor T1 becomes.

When a voltage obtained by converting the photoelectric current on a natural-logarithm basis appears at the gate of the MOS transistor T52 in this way, now that the voltage at the node "a" has already been reset to a voltage higher than the surface potential that is determined by the gate voltage of the MOS transistor T52, positive electric charge flows from the capacitor C through the MOS transistor 52. Here, the amount of positive electric charge flowing from the capacitor C depends on the gate voltage of the MOS transistor T52. Accordingly, the more intense the incident light, and thus the lower the source voltage of the MOS transistor T1, the larger the amount of positive electric charge flowing from the capacitor C.

The positive electric charge flowing from the capacitor C in this way causes the voltage at the node "a" to have the value obtained by converting the integral of the amount of incident light on a natural-logarithm basis. Then, when the pulse signal φV is fed to the MOS transistor T5 to turn it on, a current having the value obtained by converting the integral of the photoelectric current on a natural-logarithm basis flows through the MOS transistors T4 and T5 to the output signal line 6. In this way, a signal (output current) proportional to the logarithm of the amount of incident light is read, and thereafter the MOS transistor T5 is turned off.

(1-b) Sensitivity Variation Detection

Figure 23:
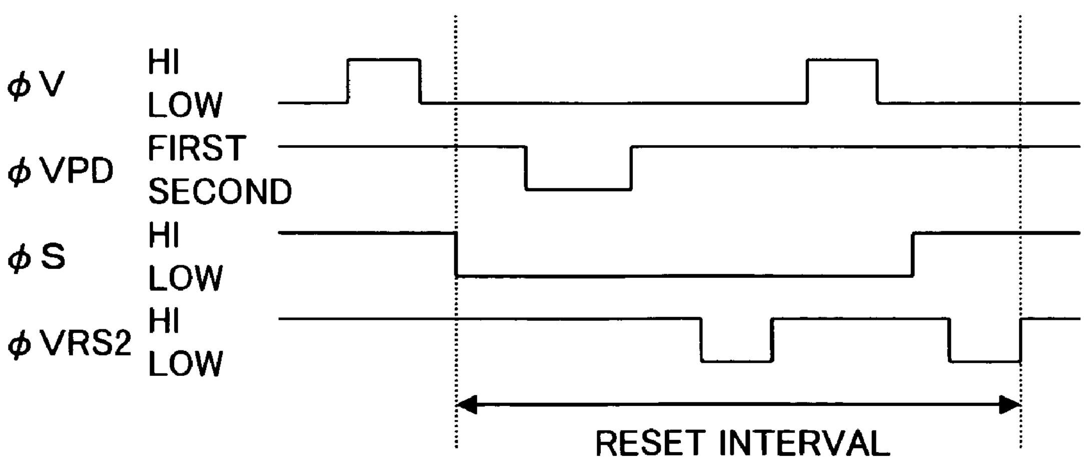
FIG. 23 is a timing chart of the signals fed to the elements constituting a pixel in the fifteenth embodiment.

FIG. 23 shows a timing chart of relevant signals as observed when variations in sensitivity among the individual pixels are detected. As described above, by feeding the pulse signal φV to the gate of the MOS transistor T5, an output signal is read. Thereafter, as in the fourteenth embodiment (FIG. 20), first, the signal φS is turned to a low level to turn the MOS transistor T7 off. Then, the signal φVPD is made equal to the second voltage to accumulate negative electric charge between the drain and the source of the MOS transistor T1.

Next, when the signal φVPD is turned back to the first voltage, part of the accumulated negative electric charge flows into the signal line of the signal φVPD, and the rest of the negative electric charge remains at the source of the MOS transistor T1. Here, the amount of negative electric charge that remains depends on the threshold voltage between the gate and the source. After the negative electric charge has been accumulated at the source of the MOS transistor T1 in this way, the pulse signal φVRS2 is fed to the gate of the MOS transistor T56 to reset the voltage at the node "a", and then the pulse signal φV is fed to the gate of the MOS transistor T5 to read an output signal. Here, the pulse signal φVRS2 fed to the gate of the MOS transistor T56 is a low-level pulse signal.

The output signal thus read has the value corresponding to the threshold voltage of the MOS transistor T1, and therefore, on the basis of this signal, it is possible to detect variations in sensitivity among the individual pixels. Lastly, to permit image shooting operation, the signal φS is turned to a high level to turn the MOS transistor T7 on, and then the pulse signal φVRS2 is fed to the gate of the MOS transistor T56 to reset the voltage at the node "a". The signal thus obtained as a result of sensitivity variation detection is stored as compensation data in memory such as a line memory so that, for each pixel, the output signal obtained therefrom in actual image shooting is compensated on the basis of this compensation data. This makes it possible to remove, from the output signal, components resulting from variations among the pixels.

(2) Mode in which the Output Signal is Produced by Converting the Photoelectric Current on a Linear Basis In this mode, as in the fourteenth embodiment, the voltage of the signal φVPD is kept at a third voltage that is equal to the operation point of the MOS transistor T52. Moreover, in this mode, the signal φS is kept at a high level all the time, and thus the MOS transistor T7, which receives the signal φS at its gate, is kept on all the time. As a result, in this circuit configuration, the MOS transistor T1 corresponds to the resetting MOS transistor T102 shown in FIG. 47, and the MOS transistor T52 corresponds to the signal-amplification MOS transistor T101 shown in FIG. 47.

(2-a) Image Shooting Operation

First, as in the fourteenth embodiment, the signal φVPG is turned to a low level to turn the resetting MOS transistor T1 off. Here, it is assumed that the voltage at the capacitor C, and thus at the node "a", has already been reset by the MOS transistor T56. In this state, in which the resetting MOS transistor T1 is off, when a photoelectric current is generated in the photodiode PD, the gate voltage of the MOS transistor T52 changes. Specifically, negative photoelectric charge is fed from the photodiode PD to the gate of the MOS transistor T52, and thus the gate voltage of the MOS transistor T52 has the value obtained by converting the photoelectric current on a linear basis. Here, since the negative photoelectric charge generated in the photodiode PD flows into the gate of the MOS transistor T52, the more intense the incident light, the lower the gate voltage of the MOS transistor T52 becomes.

When a voltage obtained by converting the photoelectric current on a linear basis appears at the gate of the MOS transistor T52 in this way, now that the voltage at the node "a" has already been reset to a voltage higher than the surface potential that is determined by the gate voltage of the MOS transistor T52, positive electric charge flows from the capacitor C through the MOS transistor T52. Here, the amount of positive electric charge flowing from the capacitor C depends on the gate voltage of the MOS transistor T52. Accordingly, the more intense the incident light, and thus the lower the gate voltage of the MOS transistor T52, the larger the amount of positive electric charge flowing from the capacitor C.

The positive electric charge flowing from the capacitor C in this way causes the voltage at the node "a" to have the value that is proportional to the integral of the amount of incident light. Then, when the pulse signal $\phi V$ is fed to the MOS transistor T5 to turn it on, a current having the value obtained by converting the integral of the photoelectric current on a linear basis flows through the MOS transistors T4 and T5 to the output signal line 6. In this way, a signal (output current) proportional to the integral of the amount of incident light is read, and thereafter the MOS transistor T5 is turned off.

(2-b) Resetting Operation

Figure 24:
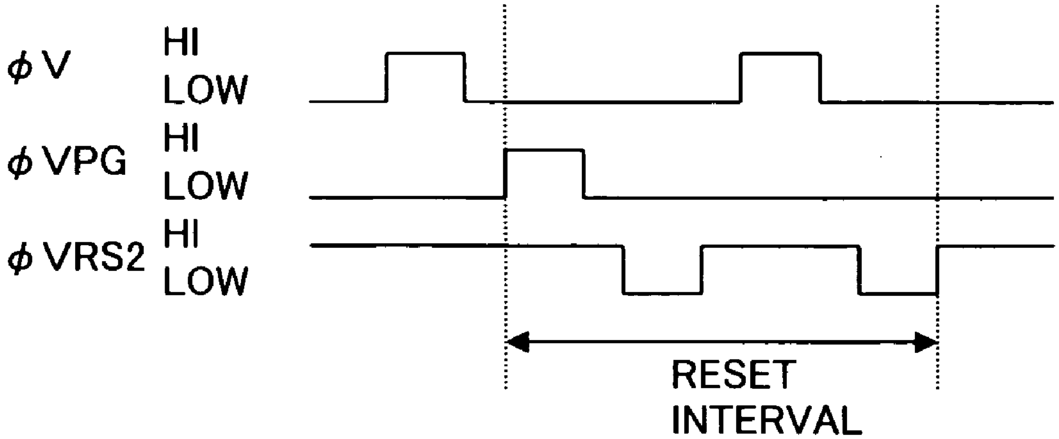
FIG. 24 is a timing chart of the signals fed to the elements constituting a pixel in the fifteenth embodiment.

FIG. 24 shows a timing chart of relevant signals as observed when each pixel is reset. As described above, by feeding the pulse signal $\phi V$ to the gate of the MOS transistor T5, an output signal is read. Thereafter, first, the signal $\phi VPG$ is turned to a high level to turn the MOS transistor T1 on. When the MOS transistor T1 is turned on in this way, the third voltage is fed to the gate of the MOS transistor T52, and thereby the gate voltage of the MOS transistor T52 is reset. Then, the signal $\phi VPG$ is turned back to a low level to turn the MOS transistor T1 off.

Next, the pulse signal $\phi VRS2$ is fed to the gate of the MOS transistor T56 to reset the voltage at the node "a", and then the pulse signal $\phi V$ is fed to the gate of the MOS transistor T5 to read an output signal. The output signal thus read has the value corresponding to the gate voltage of the MOS transistor T52, and is thus read as an output signal obtained when initialization is performed. After this output signal has been read, the pulse signal $\phi VRS2$ is fed again to the gate of the MOS transistor T56 to reset the voltage at the node "a", and then image shooting operation as described previously is restarted. Here, the pulse signal $\phi VRS2$ is a low-level pulse signal.

The signal thus obtained when initialization is performed is stored as compensation data in memory such as a line memory so that, for each pixel, the output signal obtained therefrom in actual image shooting is compensated on the basis of this compensation data. This makes it possible to remove, from the output signal, components resulting from variations among the pixels. Here, the circuit may be so configured that, as in the third embodiment (FIG. 7), a pulse signal (for example, $\phi VPS$) is fed to the drain of the MOS transistor T52 to permit this MOS transistor T52 to reset the voltage at the node "a" in response to that signal $\phi VPS$. This makes it possible to omit the MOS transistor T56 from a pixel configured as shown in FIG. 22. In that case, the pulse signal VPS fed to the drain of the MOS transistor T52 needs to be fed by way of a power line separate from that by way of which the direct-current voltage VPS is applied to the anode of the photodiode PD.

Sixteenth Embodiment

Figure 25:
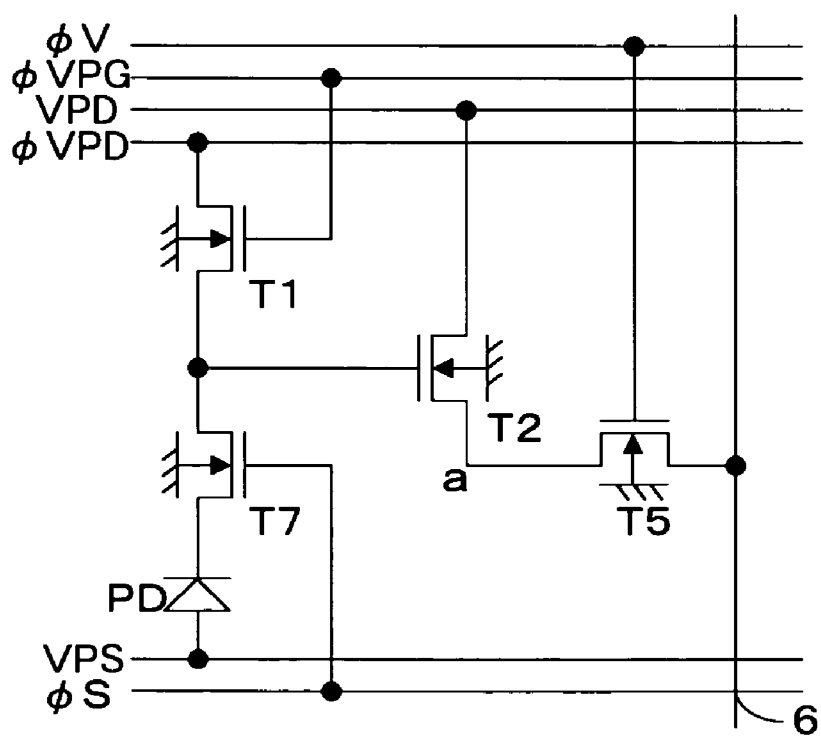
FIG. 25 is a circuit diagram showing the configuration of each pixel in a sixteenth embodiment of the invention.

Next, a sixteenth embodiment of the invention will be described with reference to the drawings relevant thereto. FIG. 25 is a circuit diagram showing the configuration of each pixel of the photoelectric converting device of this embodiment. It is to be noted that such elements, signal lines, and others as are used for the same purposes here as in the pixel shown in FIG. 19 will be identified with the same reference symbols, and their detailed descriptions will be omitted.

As shown in FIG. 25, in this embodiment, the direct-current voltage VPD is applied to the drain of the MOS transistor T2, and the capacitor C and the MOS transistor T4 found in the fourteenth embodiment (FIG. 19) are omitted. In other respects, the pixel of this embodiment is configured in the same manner as in the fourteenth embodiment.

(1) Mode in which the Output Signal is Produced by Converting the Photoelectric Current on a Natural-Logarithm Basis Here, as in the fourteenth embodiment, a first voltage is used to permit the MOS transistor T1 to operate in a subthreshold region, and a second voltage that is approximately equal to the direct-current voltage VPS is used to permit pixel-to-pixel variations in the threshold level of the MOS transistor T1 to be detected.

(1-a) Image Shooting Operation

A signal $\phi VPD$ is made equal to the first voltage to permit the MOS transistor T1 to operate in a subthreshold region, and a signal $\phi S$ fed to the gate of the MOS transistor T7 is turned to a high level to turn this MOS transistor T7 on. In this state, when light enters the photodiode PD, a photoelectric current is generated therein, and thus, due to the subthreshold characteristics of a MOS transistor, a voltage having the value obtained by converting the photoelectric current on a natural-logarithm basis appears at the source of the MOS transistor T1 and at the gate of the MOS transistor T2. Here, since negative photoelectric charge is generated in the photodiode PD and flows into the source of the MOS transistor T1, the more intense the incident light, the lower the source voltage of the MOS transistor T1 becomes.

When a voltage obtained by converting the photoelectric current on a natural-logarithm basis appears at the gate of the MOS transistor T2 in this way, the pulse signal $\phi V$ is fed to the MOS transistor T5 to turn it on, so that a current having the value obtained by converting the photoelectric current on a natural-logarithm basis flows through the MOS transistors T2 and T5 to the output signal line 6. In this way, a signal (output current) proportional to the logarithm of the amount of incident light is read, and thereafter the MOS transistor T5 is turned off.

(1-b) Sensitivity Variation Detection

Figure 26:
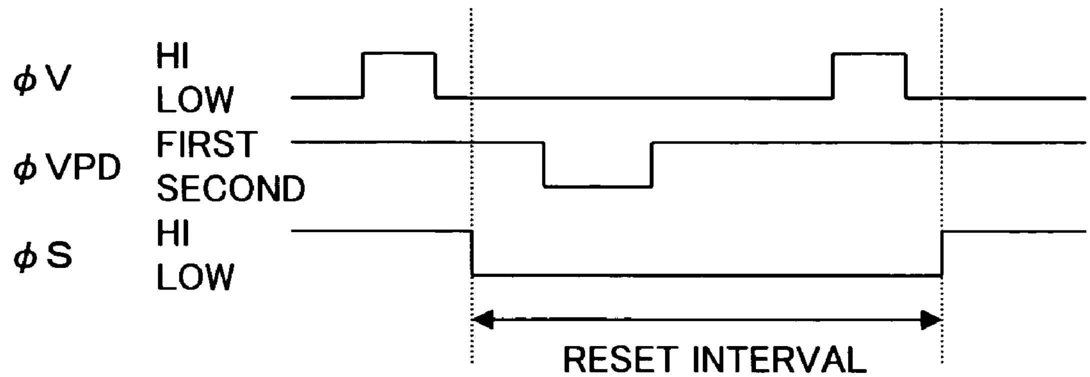
FIG. 26 is a timing chart of the signals fed to the elements constituting a pixel in the sixteenth embodiment.

FIG. 26 shows a timing chart of relevant signals as observed when variations in sensitivity among the individual pixels are detected. As described above, by feeding the pulse signal $\phi V$ to the gate of the MOS transistor T5, an output signal is read. Thereafter, as in the fourteenth embodiment (FIG. 20), first, the signal $\phi S$ is turned to a low level to turn the MOS transistor T7 off. Then, the signal $\phi VPD$ is made equal to the second voltage to accumulate negative electric charge between the drain and the source of the MOS transistor T1.

Next, when the signal ϕVPD is turned back to the first voltage, part of the accumulated negative electric charge flows into the signal line of the signal ϕVPD, and the rest of the negative electric charge remains at the source of the MOS transistor T1. Here, the amount of negative electric charge that remains depends on the threshold voltage between the gate and the source. After the negative electric charge has been accumulated at the source of the MOS transistor Ti in this way, the pulse signal ϕV is fed to the gate of the MOS transistor T5 to read an output signal.

The output signal thus read has the value corresponding to the threshold voltage of the MOS transistor T1, and therefore, on the basis of this signal, it is possible to detect variations in sensitivity among the individual pixels. Lastly, to permit image shooting operation, the signal ϕS is turned to a high level to turn the MOS transistor T7 on. The signal thus obtained as a result of sensitivity variation detection is stored as compensation data in memory such as a line memory so that, for each pixel, the output signal obtained therefrom in actual image shooting is compensated on the basis of this compensation data. This makes it possible to remove, from the output signal, components resulting from variations among the pixels.

(2) Mode in which the Output Signal is Produced by Converting the Photoelectric Current on a Linear Basis In this mode, as in the fourteenth embodiment, the voltage of the signal ϕVPD is kept at a third voltage that is equal to the operation point of the MOS transistor T2. Moreover, in this mode, the signal ϕS is kept at a high level all the time, and thus the MOS transistor T7, which receives the signal ϕS at its gate, is kept on all the time. As a result, in this circuit configuration, the MOS transistor T1 corresponds to the resetting MOS transistor T102 shown in FIG. 47, and the MOS transistor T2 corresponds to the signal-amplification MOS transistor T101 shown in FIG. 47.

(2-a) Image Shooting Operation

First, as in the fourteenth embodiment, a signal ϕVPG is turned to a low level to turn the resetting MOS transistor T1 off. In this state, in which the resetting MOS transistor T1 is off, when a photoelectric current is generated in the photodiode PD, the gate voltage of the MOS transistor T2 changes. Specifically, negative photoelectric charge is fed from the photodiode PD to the gate of the MOS transistor T2, and thus the gate voltage of the MOS transistor T2 has the value obtained by converting the photoelectric current on a linear basis. Here, since the negative photoelectric charge generated in the photodiode PD flows into the gate of the MOS transistor T2, the more intense the incident light, the lower the gate voltage of the MOS transistor T2 becomes.

When a voltage obtained by converting the photoelectric current on a linear basis appears at the gate of the MOS transistor T2 in this way, the pulse signal ϕV is fed to the MOS transistor T5 to turn it on. As a result, a current having the value obtained by converting the integral of the photoelectric current on a linear basis flows through the MOS transistors T2 and T5 to the output signal line 6. In this way, a signal (output current) proportional to the integral of the amount of incident light is read, and thereafter the MOS transistor T5 is turned off.

(2-b) Resetting Operation

Figure 27:
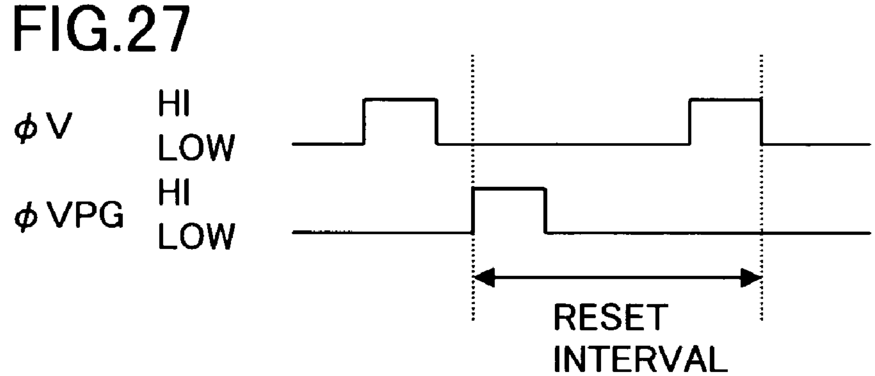
FIG. 27 is a timing chart of the signals fed to the elements constituting a pixel in the sixteenth embodiment.

FIG. 27 shows a timing chart of relevant signals as observed when each pixel is reset. As described above, by feeding the pulse signal ϕV to the gate of the MOS transistor T5, an output signal is read. Thereafter, first, the signal ϕVPG is turned to a high level to turn the MOS transistor T1 on. When the MOS transistor T1 is turned on in this way, the third voltage is fed to the gate of the MOS transistor T2, and thereby the gate voltage of the MOS transistor T2 is reset. Then, the signal ϕVPG is turned back to a low level to turn the MOS transistor T1 off.

Next, the pulse signal ϕV is fed to the gate of the MOS transistor T5 to read an output signal. The output signal thus read has the value corresponding to the gate voltage of the MOS transistor T2, and is thus read as an output signal obtained when initialization is performed. After this output signal has been read, image shooting operation as described previously is restarted. The signal thus obtained when initialization is performed is stored as compensation data in memory such as a line memory so that, for each pixel, the output signal obtained therefrom in actual image shooting is compensated on the basis of this compensation data. This makes it possible to remove, from the output signal, components resulting from variations among the pixels.

In any of the embodiments described thus far, the reading of the signal from each pixel may be achieved by the use of a charge-coupled device (CCD). In that case, the transfer of electric charge to the CCD is achieved by providing a potential barrier with a variable potential level that corresponds to the MOS transistor T5.

In all of the first to fourteenth and sixteenth embodiments described thus far, the MOS transistors T1 to T7 provided within each pixel as active elements are all composed of N-channel MOS transistors; however, these MOS transistors T1 to T7 may be composed of P-channel MOS transistors instead. On the other hand, in the fifteenth embodiment, within each pixel, the N-channel and P-channel MOS transistors may be replaced with P-channel and N-channel MOS transistors, respectively.

FIGS. 29 and 32 to 46 show seventeenth to thirty-second embodiments, which are examples of different versions of the first to sixteenth embodiments described above in which MOS transistors of the opposite polarity are used. Accordingly, in FIGS. 28 to 46, all the elements used and the voltages applied have the opposite polarities. For example, in FIG. 29 (the seventeenth embodiment), the direct-current voltage VPD is connected to the anode of the photodiode PD, and the cathode thereof is connected to the drain and the gate of the first MOS transistor T1 and to the gate of the second MOS transistor. The signal ϕVPS is fed to the source of the first MOS transistor T1.

Figure 29:
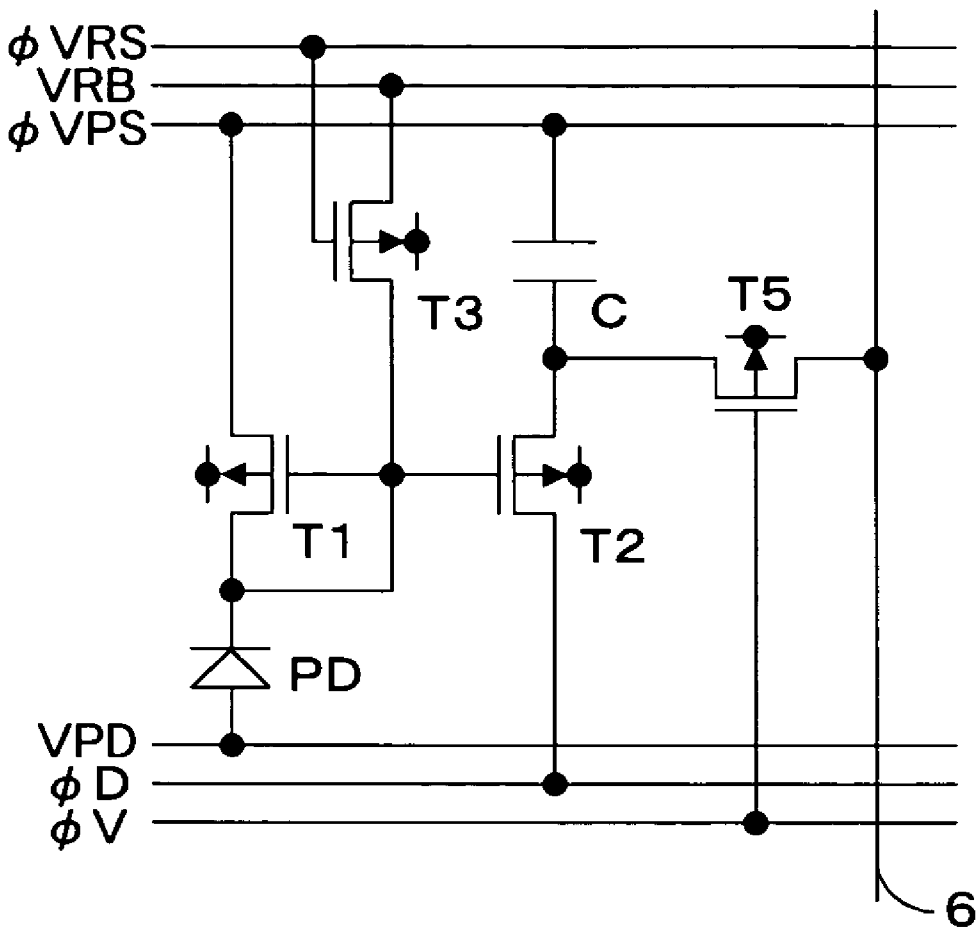
FIG. 29 is a circuit diagram showing the configuration of each pixel in a seventeenth embodiment of the invention.

When logarithmic conversion is performed within a pixel as shown in FIG. 29, the voltage of the signal ϕVPS and the direct-current voltage VPD fulfill the relation ϕVPS>VPD, thus an inverted relation as compared with the case shown in FIG. 2 (the first embodiment). Moreover, the output voltage of the capacitor C is initially high, and drops as a result of integration. Moreover, when the third MOS transistor T3 is turned on, a low voltage is applied to the gate thereof. Furthermore, in the embodiments shown in FIGS. 32 to 44 and 46 (the eighteenth to thirtieth and thirty-second embodiments), when the fifth or sixth MOS transistor T5 or T6 is turned on, a low voltage is applied to the gate thereof. On the other hand, in the embodiment shown in FIG. 45 (the thirty-first embodiment), when the fifth MOS transistor T5 is turned on, a low voltage is applied to the gate thereof, and, when the sixth MOS transistor T6 is turned on, a high voltage is applied to the gate thereof. As described above, where MOS transistors of the opposite polarity are used, although how the voltages are applied and the elements are connected differs partially, the circuits are configured substantially in the same manner and operate basically in the same manner. Therefore, with respect to the seventeenth to thirty-two embodiments, only illustrations are given in FIGS. 32 to 46, and no descriptions will be given of their configuration and operation.

Figure 28:
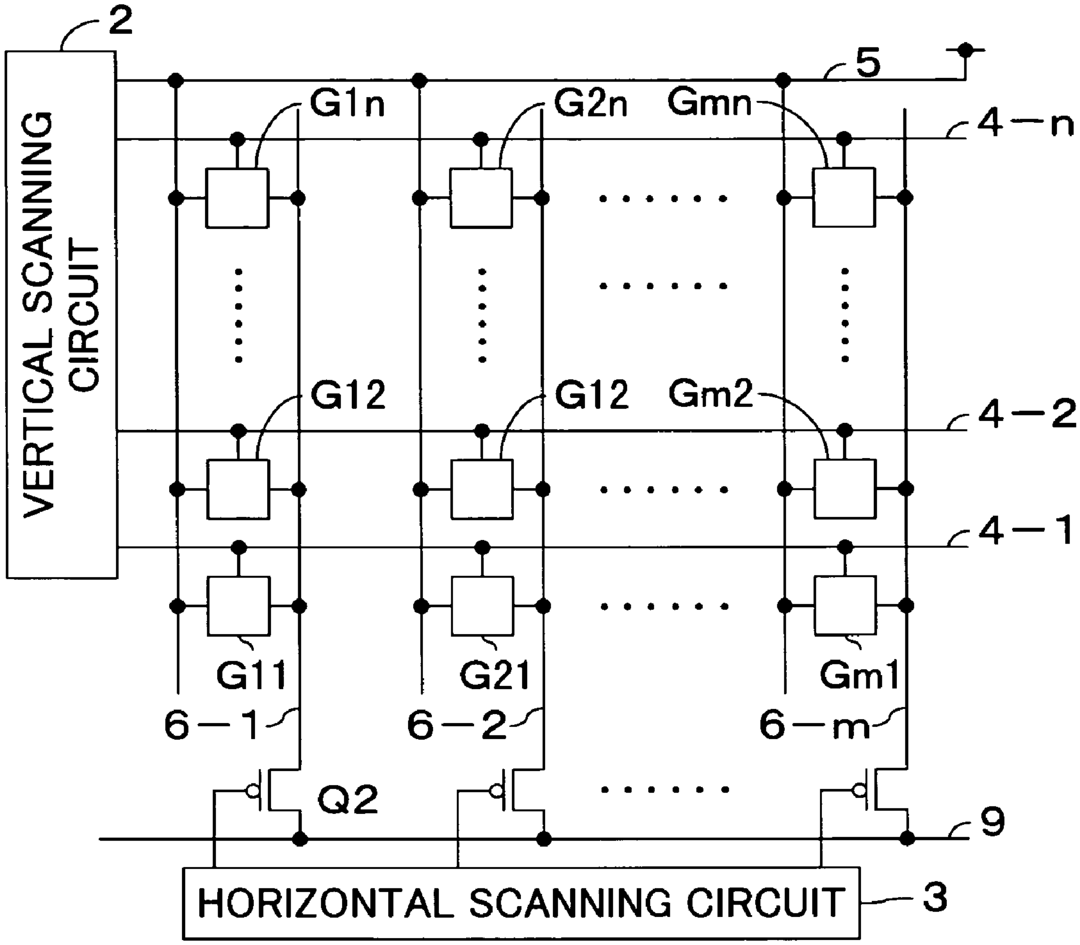
FIG. 28 is a block diagram illustrating the overall configuration of a two-dimensional photoelectric converting device embodying the invention, in a case where the active elements within a pixel are composed of P-channel MOS transistors.
Figure 30:
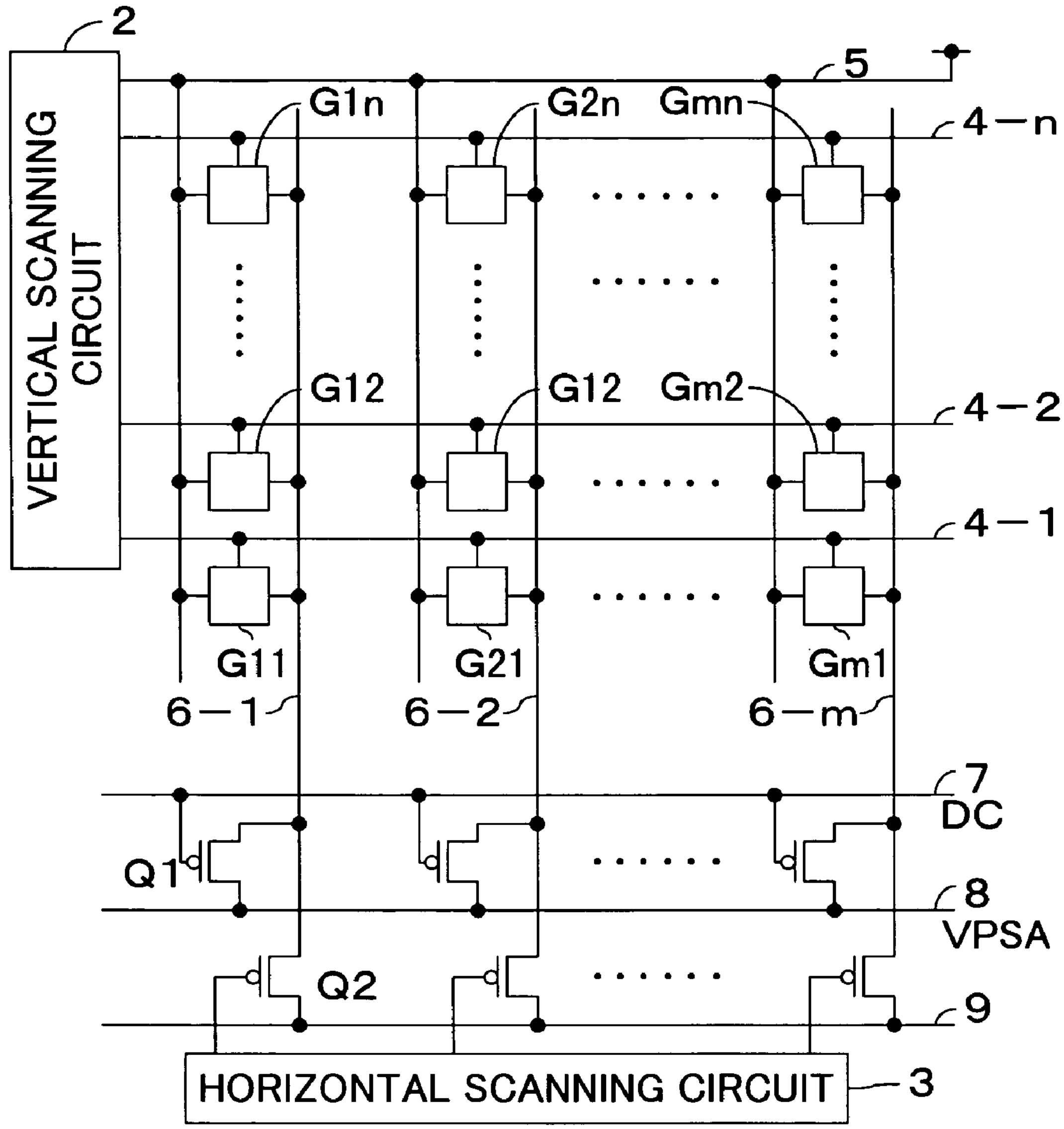
FIG. 30 is a block diagram illustrating the overall configuration of another two-dimensional photoelectric converting device embodying the invention, in a case where the active elements within a pixel are composed of P-channel MOS transistors.
Figure 31A:
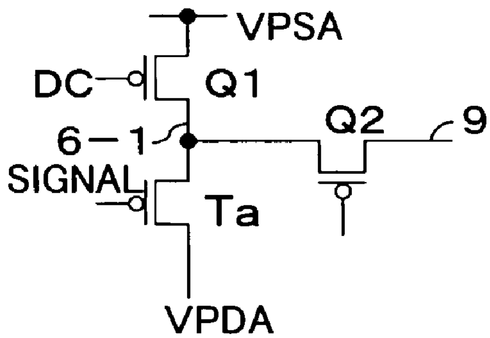
FIG. 31 is a circuit diagram of a portion of the circuit shown in FIG. 30.

FIG. 28 is a block circuit configuration diagram illustrating the overall configuration of a photoelectric converting device having pixels configured according to the seventeenth embodiment, and FIG. 30 is a block circuit configuration diagram illustrating the overall configuration of a photoelectric converting device having pixels configured according to one of the eighteenth to thirty-second embodiments. As to FIGS. 28 and 30, such elements as are found also (i.e. as play the same roles as) in FIGS. 1 and 4 will be identified with the same reference symbols, and their descriptions will be omitted. Here, a brief description will be given of the configuration shown in FIG. 30. A P-channel MOS transistor Q1 and an N-channel MOS transistor Q2 are connected to each of output signal lines 6-1, 6-2, . . . , 6-m that are laid in the column direction. The MOS transistor Q1 has its gate connected to a direct-current voltage line 7, has its drain connected to the output signal line 6-1, and has its source connected to a direct-current voltage VPSA line 8. On the other hand, the MOS transistor Q2 has its drain connected to the output signal line 6-1, has its source connected to a signal line 9 serving as a final destination line, and has its gate connected to a horizontal scanning circuit 3. Here, the MOS transistor Q1, together with a P-channel MOS transistor Ta provided within each pixel, constitutes an amplifier circuit as shown in FIG. 31A. This MOS transistor Ta corresponds to the fourth MOS transistor T4 in the eighteenth, nineteenth, twenty-second, twenty-third, thirtieth, and thirty-first embodiments, and corresponds to the second MOS transistor T2 in the twentieth, twenty-first, twenty-fourth to twenty-ninth, and thirty-second embodiments.

Figure 31B:
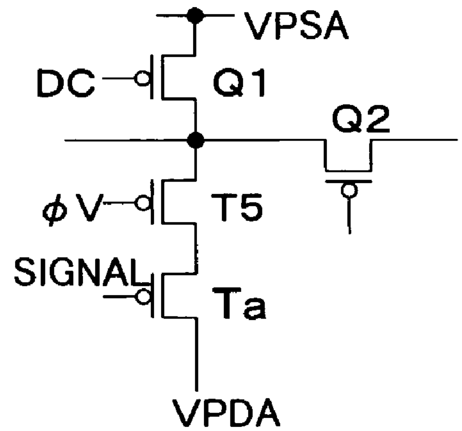
Figure 32:
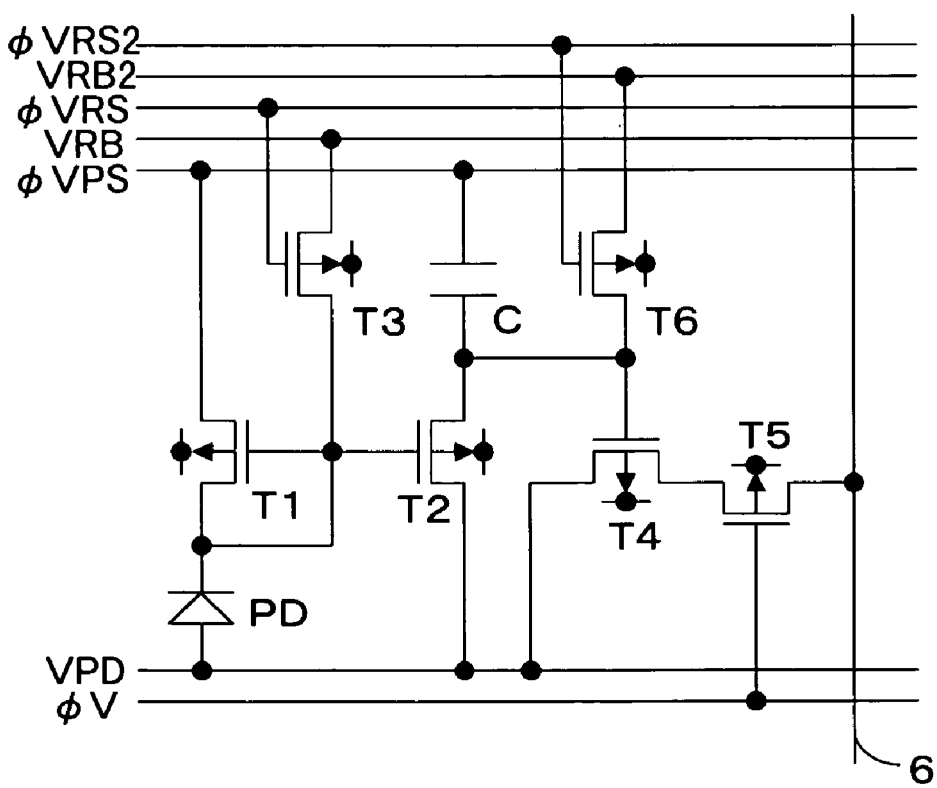
FIG. 32 is a circuit diagram showing the configuration of each pixel in a eighteenth embodiment of the invention.
Figure 33:
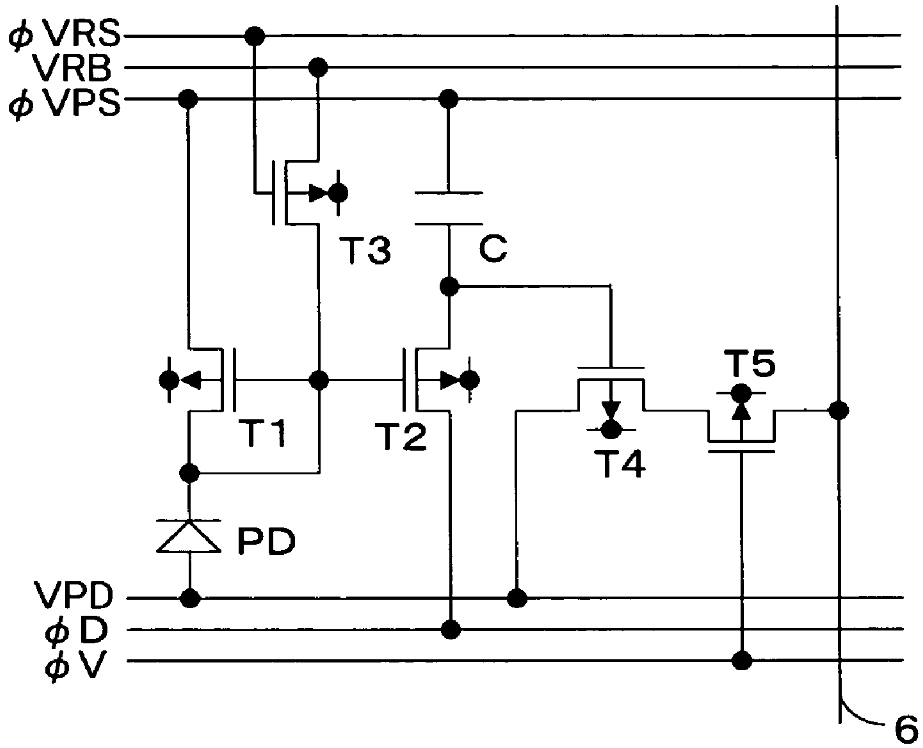
FIG. 33 is a circuit diagram showing the configuration of each pixel in a nineteenth embodiment of the invention.
Figure 34:
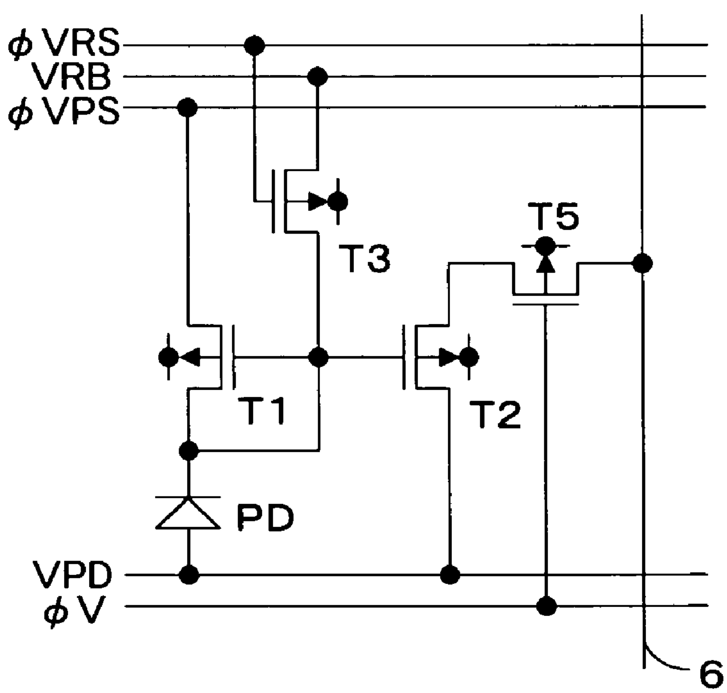
FIG. 34 is a circuit diagram showing the configuration of each pixel in a twentieth embodiment of the invention.
Figure 35:
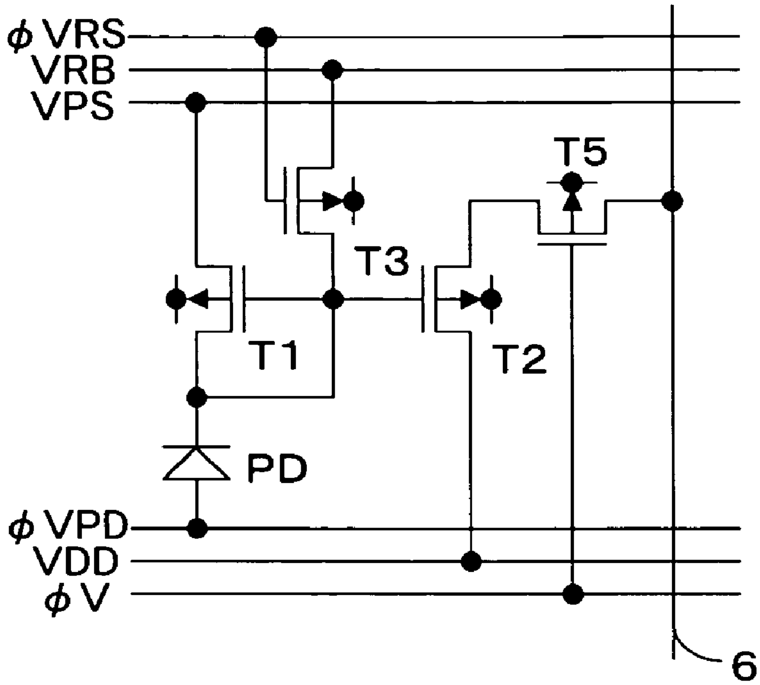
FIG. 35 is a circuit diagram showing the configuration of each pixel in a twenty-first embodiment of the invention.
Figure 36:
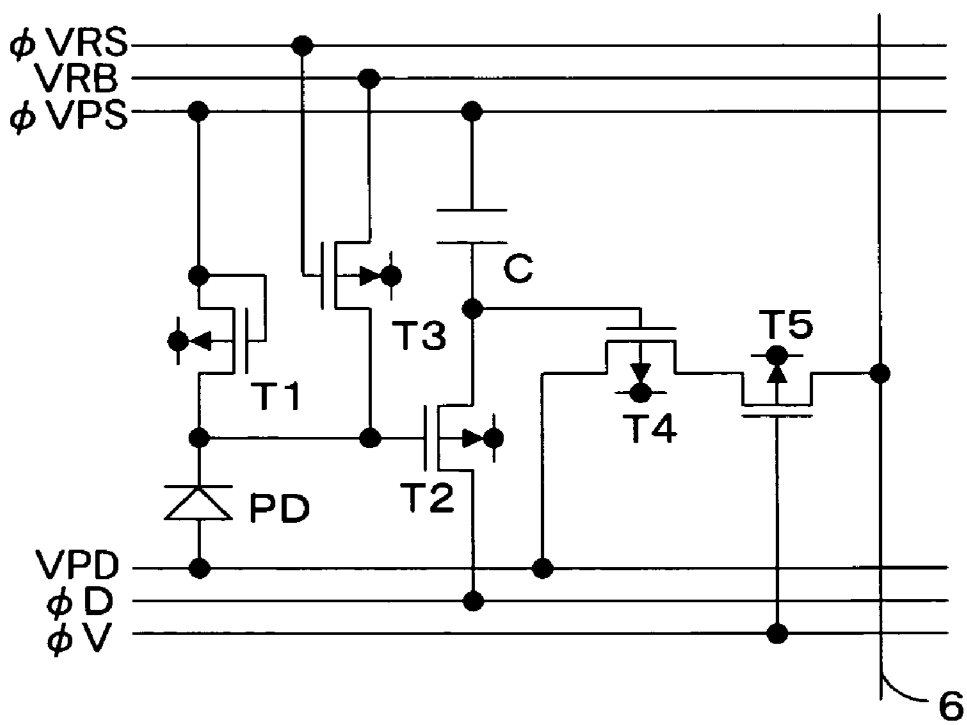
FIG. 36 is a circuit diagram showing the configuration of each pixel in a twenty-second embodiment of the invention.
Figure 37:
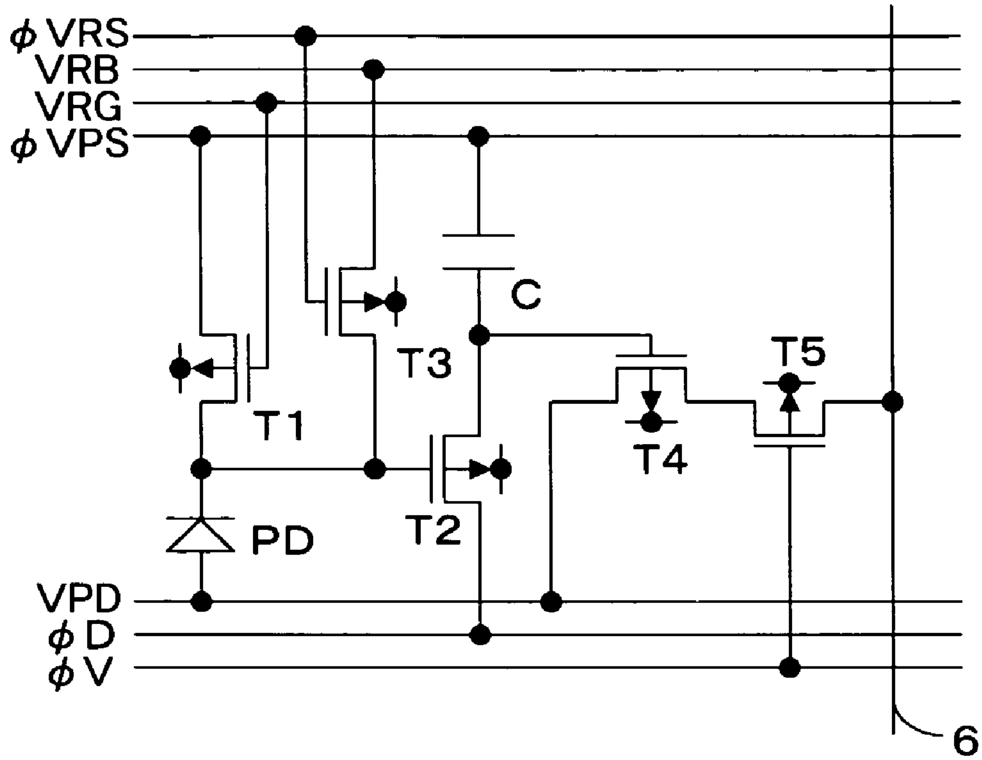
FIG. 37 is a circuit diagram showing the configuration of each pixel in a twenty-third embodiment of the invention.
Figure 38:
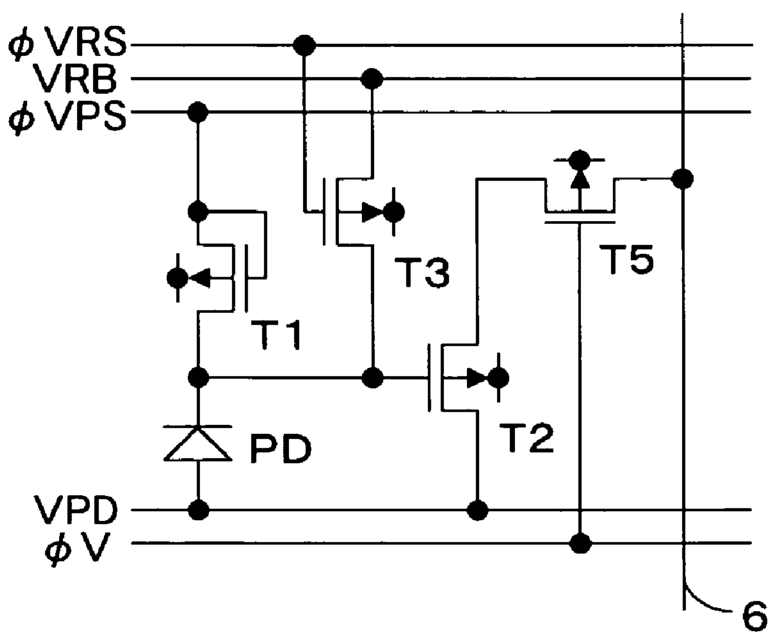
FIG. 38 is a circuit diagram showing the configuration of each pixel in a twenty-fourth embodiment of the invention.
Figure 39:
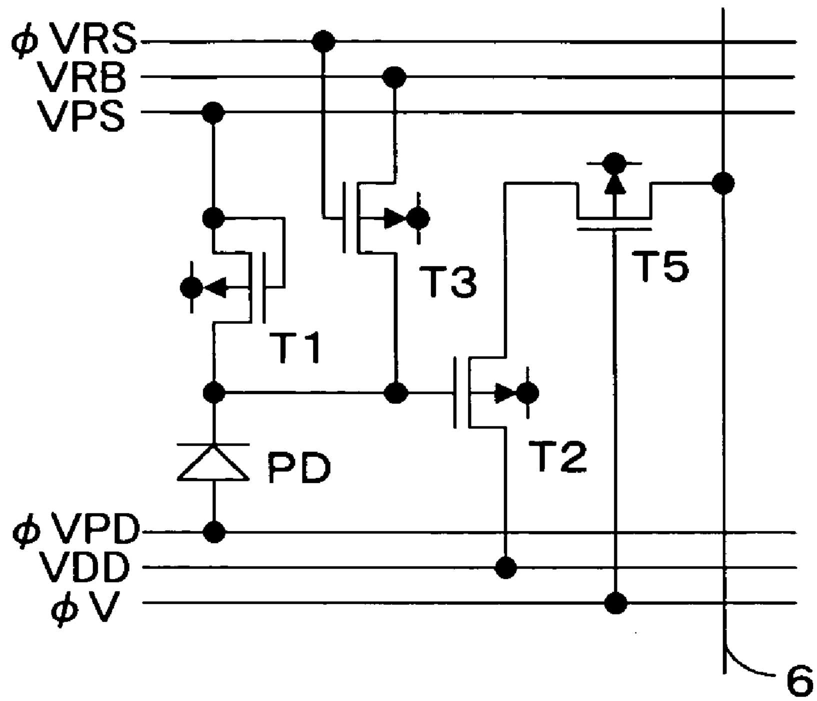
FIG. 39 is a circuit diagram showing the configuration of each pixel in a twenty-fifth embodiment of the invention.
Figure 40:
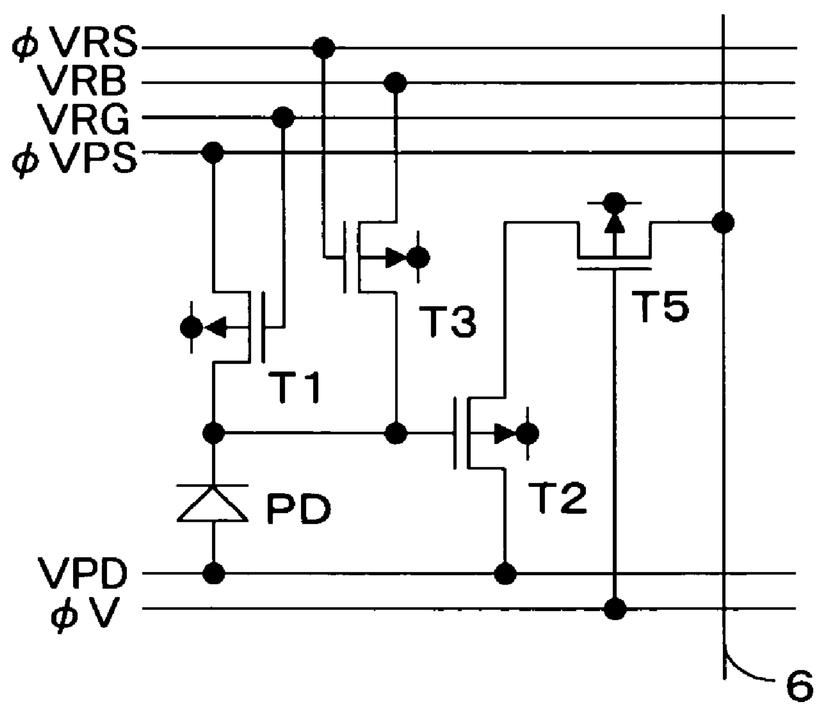
FIG. 40 is a circuit diagram showing the configuration of each pixel in a twenty-sixth embodiment of the invention.
Figure 41:
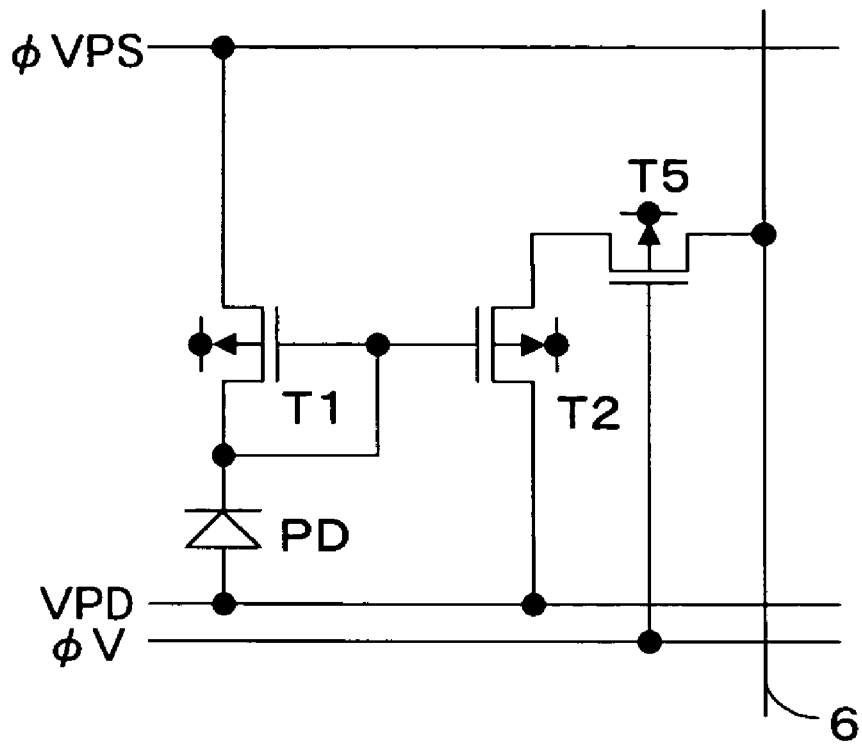
FIG. 41 is a circuit diagram showing the configuration of each pixel in a twenty-seventh embodiment of the invention.
Figure 42:
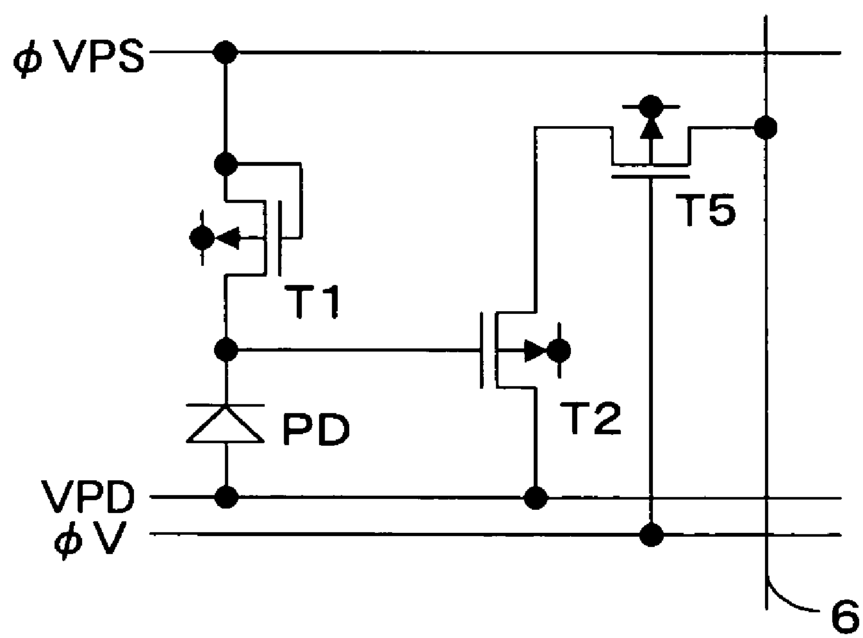
FIG. 42 is a circuit diagram showing the configuration of each pixel in a twenty-eighth embodiment of the invention.
Figure 43:
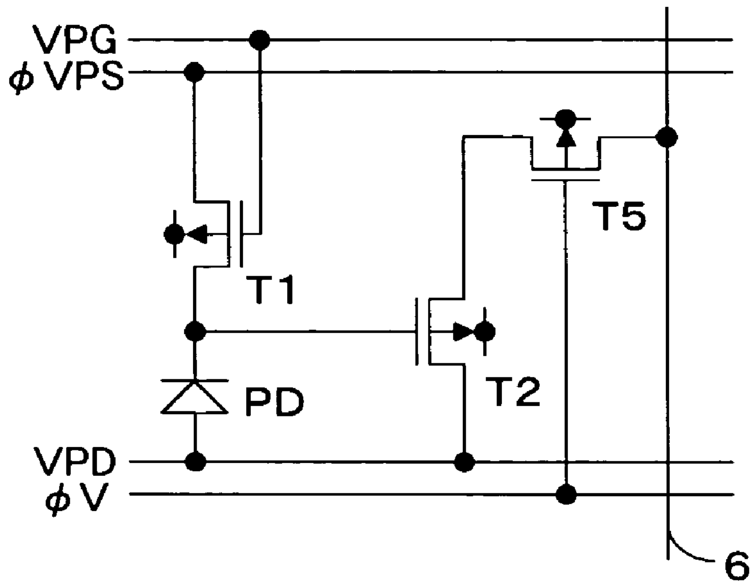
FIG. 43 is a circuit diagram showing the configuration of each pixel in a twenty-ninth embodiment of the invention.
Figure 44:
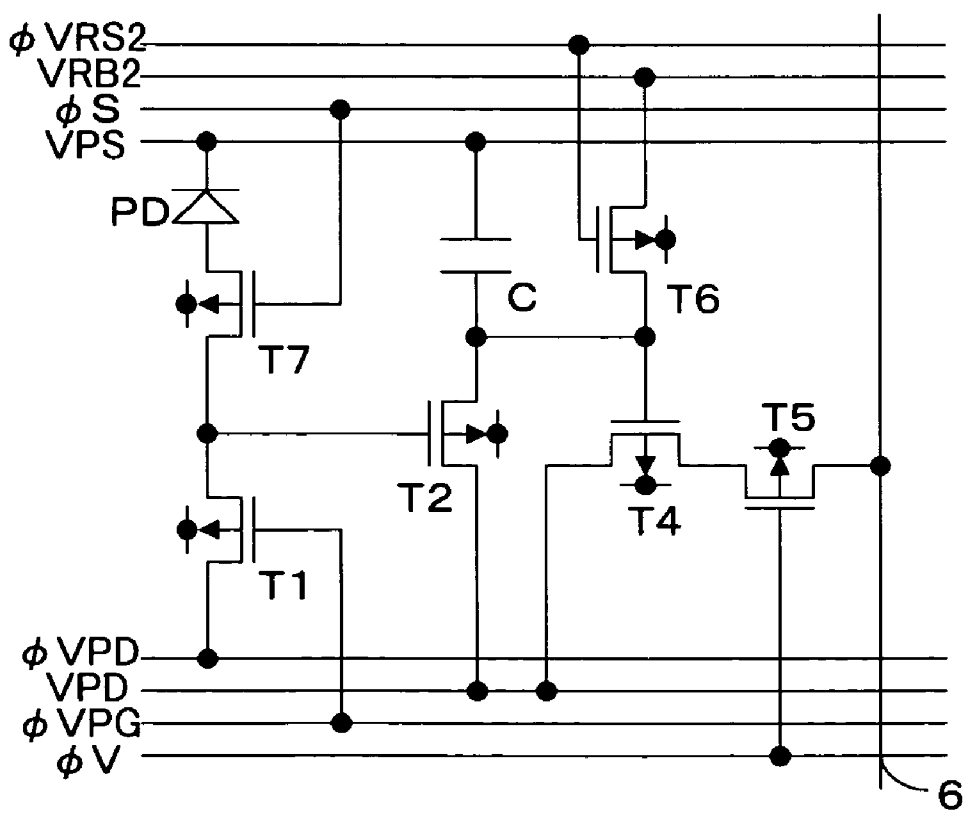
FIG. 44 is a circuit diagram showing the configuration of each pixel in a thirtieth embodiment of the invention.
Figure 45:
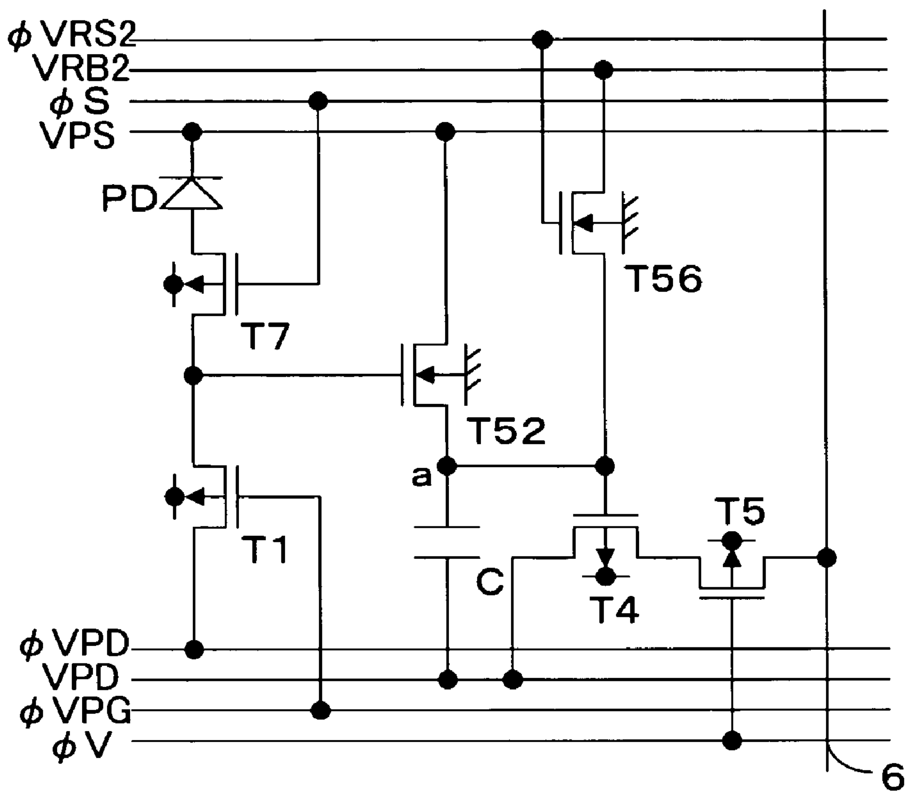
FIG. 45 is a circuit diagram showing the configuration of each pixel in a thirty-first embodiment of the invention.
Figure 46:
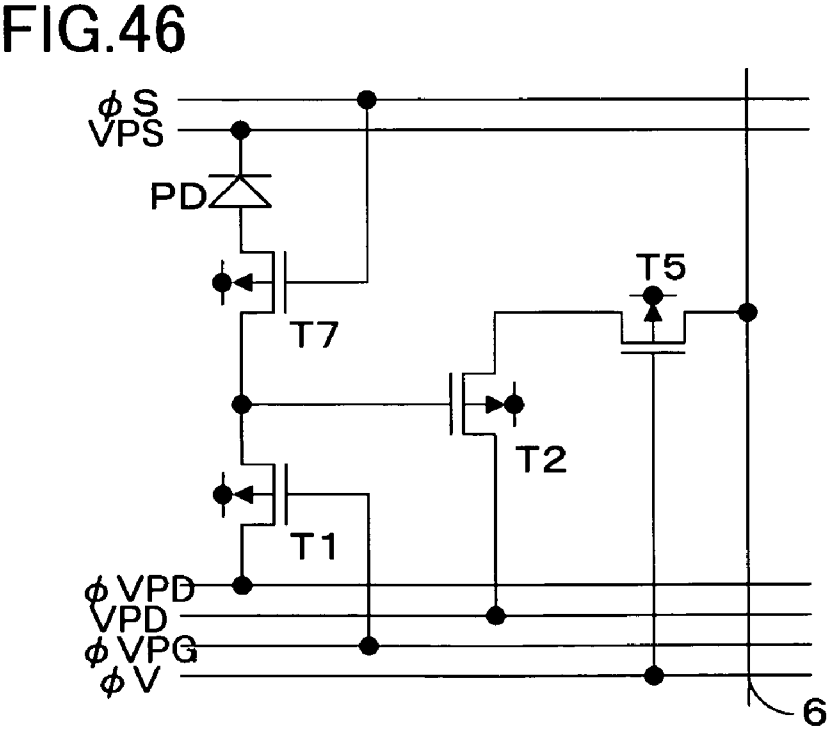
FIG. 46 is a circuit diagram showing the configuration of each pixel in a thirty-second embodiment of the invention.

Here, the MOS transistor Q1 serves as a load resistor or constant-current source for the MOS transistor Ta. Accordingly, the direct-current voltage VPSA connected to the source of this MOS transistor Q1 and the direct-current voltage VPDA connected to the drain of the MOS transistor Ta fulfill the relation VPDA<VPSA, where the direct-current voltage VPDA is equal to, for example, the ground-level voltage. The MOS transistor Q1 has its drain connected to the MOS transistor Ta, and receives a direct-current voltage at its gate. The P-channel MOS transistor Q2 is controlled by the horizontal scanning circuit 3 so as to feed the output of the amplifier circuit to the signal line 9 that serves as the final destination line. If the fifth MOS transistor T5 provided within each pixel is explicitly illustrated, the circuit shown in FIG. 31A has a circuit configuration as shown in FIG. 31B.

As described above, with a photoelectric converting device according to the present invention, it is possible to choose freely whether to produce the output signal by converting the electric signal generated in a photosensitive device, such as a photodiode, logarithmically or linearly. Accordingly, for example, it is possible to switch to logarithmic conversion when shooting a subject lit with greatly varying brightness and switch to linear conversion when shooting a dimly lit subject or a subject lit with moderately varying brightness. This makes it possible to shoot subjects of greatly different brightness, i.e. from those extremely low-brightness to those extremely high-brightness, with high accuracy. Furthermore, using MOS transistors as active elements makes it easy to achieve high-density integration, and thus a photoelectric converting device according to the present invention can be formed on a single chip together with peripheral processing circuits (such as A/D converters, digital system processors, and memory).

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A photoelectric converting device comprising:

a photoelectric conversion circuit (PCC) for generating an analog electric signal in accordance with an amount of incident light, said PCC being selectively operable, irrespective of the amount of the light, in either one of (1) a first mode in which said PCC generates the analog electric signal in such a way that intensity thereof is logarithmically proportional to the amount of the light and (2) a second mode in which said PCC generates the analog electric signal in such a way that intensity thereof is linearly proportional to the amount of the light, the PCC comprising:

a photoelectric conversion element having a direct-current voltage applied to a first electrode thereof; and a first transistor capable of logarithmic conversions and having a first electrode, a second electrode, and a control electrode, the first electrode of the transistor being connected to a second electrode of the photoelectric conversion element;

wherein switching between the first and second modes is achieved by varying a potential at the second electrode of the first transistor.

2. A photoelectric converting device as claimed in claim 1, further comprising:

a capacitor connected to said PCC so as to be charged by the analog electric signal outputted from said PCC.

3. A photoelectric converting device as claimed in claim 2, further comprising:

a reset circuit, connected to said capacitor, for resetting said capacitor.

4. A photoelectric converting device as claimed in claim 3, wherein said reset circuit comprises a second transistor having a first electrode, a second electrode, and a control electrode, said first electrode of said second transistor being connected to said capacitor, wherein said capacitor is reset when an electric signal is applied to said control electrode of said second transistor so as to make a path between said first and second electrodes of said second transistor conduct.

5. A photoelectric converting device as claimed in claim 1, further comprising:

an amplifying circuit, connected to said PCC, for amplifying the analog electric signal outputted from said PCC.

6. A photoelectric converting device as claimed in claim 5, further comprising:

a capacitor provided between said PCC and said amplifying circuit so as to be charged by the analog electric signal outputted from said PCC, wherein said amplifying circuit amplifies the analog electric signal by which said capacitor is charged.

7. A photoelectric converting device as claimed in claim 6, further comprising:

a reset circuit, connected to said capacitor, for resetting said capacitor.

8. A photoelectric converting device as claimed in claim 5, wherein no capacitor is provided between said PCC and said amplifying circuit.

9. A photoelectric converting device as claimed in claim 1, wherein a control electrode of said first transistor is connected to the second electrode of said photoelectric conversion element so as to receive an output current from said photoelectric conversion element, and said PCC further comprises:

a second transistor having a first electrode, a second electrode, and a control electrode, said second transistor receiving at the first electrode thereof a direct-current voltage, the control electrode of said second transistor being connected to the control electrode of said first transistor, and said second transistor outputting at the second electrode thereof the analog electric signal, wherein, by varying a potential difference between the first and second electrodes of said first transistor, how said PCC operates is switched between said first and second modes.

10. A photoelectric converting device as claimed in claim 9, further comprising:

a reset circuit for initializing said PCC after said PCC has operated in said second mode and outputted the analog electric signal to an output signal line.

11. A photoelectric converting device as claimed in claim 9, wherein said PCC has a third transistor having a first electrode, a second electrode, and a control electrode, the first electrode of said third transistor being connected to the control electrode of said first and second transistors, the second electrode of said third transistor being connected to a direct-current voltage, wherein, after said PCC has operated in said second mode and outputted the analog electric signal to an output signal line, said PCC is reset by varying a voltage level applied to the control electrode of said third transistor so as to make said third transistor conduct so that said first and second transistors discharge electric charge accumulated therein.

12. A photoelectric converting device as claimed in claim 1, wherein the first electrode of said first transistor receives an output current from said photoelectric conversion element, and the second and control electrodes of said first transistor are connected together, and the PCC further comprises:

a second transistor having a first electrode, a second electrode, and a control electrode, said second transistor receiving at the first electrode thereof a direct-current voltage, the control electrode of said second transistor being connected to the first electrode of said first transistor, said second transistor outputting at the second electrode thereof the analog electric signal, wherein, by varying a potential difference between the first and second electrodes of said first transistor, how said PCC operates is switched between said first and second modes.

13. A photoelectric converting device as claimed in claim 12, further comprising:

a reset circuit for initializing said PCC after said PCC has operated in said second mode and outputted the analog electric signal to an output signal line.

14. A photoelectric converting device as claimed in claim 12, wherein said PCC has a third transistor having a first electrode, a second electrode, and a control electrode, the first electrode of said third transistor being connected to the control electrode of said second transistor, the second electrode of said third transistor being connected to a direct-current voltage, wherein, after said PCC has operated in said second mode and outputted the analog electric signal to an output signal line, said PCC is reset by varying a voltage level applied to the control electrode of said third transistor so as to make said third transistor conduct so that said first and second transistors discharge electric charge accumulated therein.

15. A photoelectric converting device comprising:

a photoelectric conversion circuit (PCC) for generating an analog electric signal in accordance with an amount of incident light, said PCC being selectively operable, irrespective of the amount of the light, in either one of (1) a first mode in which said PCC generates the analog electric signal in such a way that intensity thereof is logarithmically proportional to the amount of the light and (2) a second mode in which said PCC generates the analog electric signal in such a way that intensity thereof is linearly proportional to the amount of the light, wherein said PCC comprises:

a photoelectric conversion element that receives at a second electrode thereof a direct-current voltage;

a first transistor having a first electrode, a second electrode, and a control electrode, the second electrode of said first transistor being connected to a first electrode of said photoelectric conversion element, and a second transistor having a first electrode, a second electrode, and a control electrode, said second transistor receiving at the first electrode thereof a direct-current voltage, the control electrode of said second transistor being connected to the second electrode of said first transistor, said second transistor outputting at the second electrode thereof the analog electric signal, wherein, by varying a voltage fed to the control electrode of said first transistor, how said PCC operates is switched between said first and second modes.

16. A photoelectric converting device as claimed in claim 15, wherein said PCC has a third transistor having a first electrode, a second electrode, and a control electrode, the first electrode of said third transistor being connected to the second electrode of said first transistor, the second electrode of said third transistor being connected to the first electrode of said photoelectric conversion element, said third transistor thus being connected in series with said first transistor and said photoelectric conversion element, wherein, while said PCC is operating in said first mode, said third transistor is kept in a conducting state during a shooting operation and is kept in a non-conducting state during an operation for detecting variations in sensitivity of individual pixels, and wherein, while said PCC is operating in said second mode, said third transistor is kept in an conducting state all the time.

17. A photoelectric converting device comprising:

a photoelectric conversion circuit (PCC) for generating an analog electric signal in accordance with an amount of incident light, said PCC being selectively operable, based on a signal inputted to said photoelectric converting device, in either one of (1) a first mode in which said PCC generates the analog electric signal in such a way that intensity thereof is logarithmically proportional to the amount of the light and (2) a second mode in which said PCC generates the analog electric signal in such a way that intensity thereof is linearly proportional to the amount of the light, wherein the photoelectric conversion circuit comprises:

a photoelectric conversion element having a direct-current voltage applied to a first electrode thereof; and a transistor capable of logarithmic conversions and having a first electrode, a second electrode, and a control electrode, the first electrode of the transistor being connected to a second electrode of the photoelectric conversion element, wherein switching between the first and second modes is achieved by varying a potential at the second electrode of the transistor.

18. A photoelectric converting device as claimed in claim 17, further comprising:

a capacitor connected to said PCC so as to be charged by the analog electric signal outputted from said PCC.

19. A photoelectric converting device as claimed in claim 18, further comprising:

a reset circuit, connected to said capacitor, for resetting said capacitor.

20. A photoelectric converting device as claimed in claim 19, wherein said reset circuit comprises a transistor having a first electrode, a second electrode, and a control electrode, said first electrode being connected to said capacitor, wherein said capacitor is reset when an electric signal is applied to said control electrode so as to make a path between said first and second electrodes conduct.

21. A photoelectric converting device as claimed in claim 17, further comprising:

an amplifying circuit, connected to said PCC, for amplifying the analog electric signal outputted from said PCC.

22. A photoelectric converting device as claimed in claim 21, further comprising:

a capacitor provided between said PCC and said amplifying circuit so as to be charged by the analog electric signal outputted from said PCC, wherein said amplifying circuit amplifies the analog electric signal by which said capacitor is charged.

23. A photoelectric converting device as claimed in claim 22, further comprising:

a reset circuit, connected to said capacitor, for resetting said capacitor.

24. A photoelectric converting device as claimed in claim 21, wherein no capacitor is provided between said PCC and said amplifying circuit.

25. A photoelectric converting device as claimed in claim 17, wherein said PCC comprises:

a photoelectric conversion element that receives at a first electrode thereof a direct-current voltage;

a first transistor having a first electrode, a second electrode, and a control electrode, the first and control electrodes of said first transistor being connected to a second electrode of said photoelectric conversion element so as to receive an output current from said photoelectric conversion element, and a second transistor having a first electrode, a second electrode, and a control electrode, said second transistor receiving at the first electrode thereof a direct-current voltage, the control electrode of said second transistor being connected to the control electrode of said first transistor, said second transistor outputting at the second electrode thereof the analog electric signal, wherein, by varying a potential difference between the first and second electrodes of said first transistor, how said PCC operates is switched between said first and second modes.

26. A photoelectric converting device as claimed in claim 25, further comprising:

a reset circuit for initializing said PCC after said PCC has operated in said second mode and outputted the analog electric signal to an output signal line.

27. A photoelectric converting device as claimed in claim 25, wherein said PCC has a third transistor having a first electrode, a second electrode, and a control electrode, the first electrode of said third transistor being connected to the control electrode of said first and second transistors, the second electrode of said third transistor being connected to a direct-current voltage, wherein, after said PCC has operated in said second mode and outputted the analog electric signal to an output signal line, said PCC is reset by varying a voltage level applied to the control electrode of said third transistor so as to make said third transistor conduct so that said first and second transistors discharge electric charge accumulated therein.

28. A photoelectric converting device as claimed in claim 17, wherein said PCC comprises:

a photoelectric conversion element that receives at a first electrode thereof a direct-current voltage;

a first transistor having a first electrode, a second electrode, and a control electrode, the first electrode of said first transistor being connected to a second electrode of said photoelectric conversion element so as to receive an output current from said photoelectric conversion element, the second and control electrodes of said first transistor being connected together, and a second transistor having a first electrode, a second electrode, and a control electrode, said second transistor receiving at the first electrode thereof a direct-current voltage, the control electrode of said second transistor being connected to the first electrode of said first transistor, said second transistor outputting at the second electrode thereof the analog electric signal, wherein, by varying a potential difference between the first and second electrodes of said first transistor, how said PCC operates is switched between said first and second modes.

29. A photoelectric converting device as claimed in claim 28, further comprising:

a reset circuit for initializing said PCC after said PCC has operated in said second mode and outputted the analog electric signal to an output signal line.

30. A photoelectric converting device as claimed in claim 28, wherein said PCC has a third transistor having a first electrode, a second electrode, and a control electrode, the first electrode of said third transistor being connected to the control electrode of said second transistor, the second electrode of said third transistor being connected to a direct-current voltage, wherein, after said PCC has operated in said second mode and outputted the analog electric signal to an output signal line, said PCC is reset by varying a voltage level applied to the control electrode of said third transistor so as to make said third transistor conduct so that said first and second transistors discharge electric charge accumulated therein.

31. A photoelectric converting device as claimed in comprising:

a photoelectric conversion circuit (PCC) for generating an analog electric signal in accordance with an amount of incident light, said PCC being selectively operable, based on a signal inputted to said photoelectric converting device, in either one of (1) a first mode in which said PCC generates the analog electric signal in such a way that intensity thereof is logarithmically proportional to the amount of the light and (2) a second mode in which said PCC generates the analog electric signal in such a way that intensity thereof is linearly proportional to the amount of the light, wherein said PCC comprises:

a photoelectric conversion element that receives at a second electrode thereof a direct-current voltage;

a first transistor having a first electrode, a second electrode, and a control electrode, the second electrode of said first transistor being connected to a first electrode of said photoelectric conversion element, and a second transistor having a first electrode, a second electrode, and a control electrode, said second transistor receiving at the first electrode thereof a direct-current voltage, the control electrode of said second transistor being connected to the second electrode of said first transistor, said second transistor outputting at the second electrode thereof the analog electric signal, wherein, by varying a voltage fed to the control electrode of said first transistor, how said PCC operates is switched between said first and second modes.

32. A photoelectric converting device as claimed in claim 31, wherein said PCC has a third transistor having a first electrode, a second electrode, and a control electrode, the first electrode of said third transistor being connected to the second electrode of said first transistor, the second electrode of said third transistor being connected to the first electrode of said photoelectric conversion element, said third transistor thus being connected in series with said first transistor and said photoelectric conversion element, wherein, while said PCC is operating in said first mode, said third transistor is kept in a conducting state during a shooting operation and is kept in a non-conducting state during an operation for detecting variations in sensitivity of individual pixels, and wherein, while said PCC is operating in said second mode, said third transistor is kept in an conducting state all the time.

33. A photoelectric converting device comprising:

a photoelectric conversion circuit (PCC) for generating an analog electric signal in accordance with an amount of incident light, wherein intensity of the analog electric signal is logarithmically proportional to the amount of the light; and an amplifying circuit, connected to said PCC, for amplifying the analog electric signal outputted from said PCC, wherein no capacitor is provided between said PCC and said amplifying circuit; and a load resistor or constant-current source that is connected to the output signal line to which the amplifying transistor outputs a signal;

wherein said amplifying circuit is an amplifying transistor that amplifies the analog electric signal outputted from said PCC and fed to the control electrode without being integrated, wherein the analog electric signal outputted from said PCC is a voltage signal, and wherein said amplifying transistor is a MOS transistor that receives at a gate electrode thereof the voltage signal outputted from said PCC, that receives at a first electrode thereof a direct-current voltage, and that has a second electrode thereof connected to an output signal line.

34. A photoelectric converting device as claimed in claim 33, wherein said load resistor or constant-current source is a resistive transistor having a first electrode thereof connected to the output signal line, having a second electrode thereof connected to a direct-current voltage, and having a control electrode thereof connected to a direct-current voltage.

35. A photoelectric converting device as claimed in claim 34 wherein said amplifying transistor is an N-channel MOS transistor, and the direct-current voltage applied to the first electrode of said amplifying transistor is higher than the direct-current voltage connected to the second electrode of said resistive transistor.

36. A photoelectric converting device as claimed in claim 34 wherein said amplifying transistor is a P-channel MOS transistor, and the direct-current voltage applied to the first electrode of said amplifying transistor is lower than the direct-current voltage connected to the second electrode of said resistive transistor.

37. A photoelectric converting device as claimed in claim 33, wherein said PCC comprises:

a photoelectric conversion element that receives at a first electrode thereof a direct-current voltage; and a transistor having a first electrode, a second electrode, and a control electrode, the first and control electrodes of said transistor being connected to a second electrode of the photoelectric conversion element so as to receive an output current from the photoelectric conversion element, wherein a voltage signal appearing at the control electrode of said transistor is used as an output signal.

38. A photoelectric converting device as claimed in claim 33, wherein said PCC comprises:

a photoelectric conversion element that receives at a first electrode thereof a direct-current voltage; and a transistor having a first electrode, a second electrode, and a control electrode, the first electrode of said transistor being connected to a second electrode of the photoelectric conversion element so as to receive an output current from the photoelectric conversion element, the second and control electrodes of said transistor being connected together, wherein a voltage signal appearing at the first electrode of said transistor is used as an output signal.

39. A photoelectric converting device as claimed in claim 33, wherein said PCC comprises:

a photodiode that receives at a first electrode thereof a direct-current voltage; and a MOS transistor having a first electrode, a second electrode, and a gate electrode, the first and gate electrodes of said MOS transistor being connected to a second electrode of the photodiode so as to receive an output current from the photodiode, wherein a voltage signal appearing at the gate electrode of said MOS transistor when said MOS transistor is made to operate in a subthreshold region below a threshold level thereof is used as an output signal.

40. A photoelectric converting device as claimed in claim 33, wherein said PCC comprises:

a photodiode that receives at a first electrode thereof a direct-current voltage; and a MOS transistor having a first electrode, a second electrode, and a gate electrode, the first electrode of said MOS transistor being connected to a second electrode of the photodiode so as to receive an output current from the photodiode, the second and gate electrodes of said MOS transistor being connected together, wherein a voltage signal appearing at the first electrode of said MOS transistor when said MOS transistor is made to operate in a subthreshold region below a threshold level thereof is used as an output signal.

41. A photoelectric converting device comprising:

a photoelectric conversion circuit (PCC) for generating an analog electric signal in accordance with an amount of incident light, wherein intensity of the analog electric signal is logarithmically proportional to the amount of the light, wherein said PCC comprises:

a photoelectric conversion element that receives at a first electrode thereof a direct-current voltage; and a transistor having a first electrode, a second electrode, and a control electrode, the first electrode of said transistor being connected to a second electrode of the photoelectric conversion element so as to receive an output current from the photoelectric conversion element, said transistor receiving at the control electrode thereof a direct-current voltage, wherein a voltage signal appearing at the first electrode of said transistor is used as an output signal; and an amplifying circuit, connected to said PCC, for amplifying the analog electric signal outputted from said PCC, wherein no capacitor is provided between said PCC and said amplifying circuit.

42. A photoelectric converting device as claimed in claim 41, wherein said PCC comprises:

a photodiode that receives at a first electrode thereof a direct-current voltage; and a MOS transistor having a first electrode, a second electrode, and a gate electrode, the first electrode of said MOS transistor being connected to a second electrode of the photodiode so as to receive an output current from the photodiode, said MOS transistor receiving at the gate electrode thereof a direct-current voltage, wherein a voltage signal appearing at the first electrode of said MOS transistor when said MOS transistor is made to operate in a subthreshold region below a threshold level thereof is used as an output signal.

43. A photoelectric converting device comprising:

a photoelectric conversion circuit (PCC) for generating an analog electric signal in accordance with an amount of incident light, wherein intensity of the analog electric signal is logarithmically proportional to the amount of the light;

an amplifying circuit, connected to said PCC, for amplifying the analog electric signal outputted from said PCC, wherein no integrator circuit is provided between said PCC and said amplifying circuit; and a load resistor or constant-current source that is connected to the output signal line to which the amplifying transistor outputs a signal, wherein said amplifying circuit is an amplifying transistor that amplifies the analog electric signal outputted from said PCC and fed to the control electrode without being integrated wherein the analog electric signal outputted from said PCC is a voltage signal, and wherein said amplifying transistor is a MOS transistor that receives at a gate electrode thereof the voltage signal outputted from said PCC, that receives at a first electrode thereof a direct-current voltage and that has a second electrode thereof connected to an output signal line.

44. A photoelectric converting device as claimed in claim 43, wherein said load resistor or constant-current source is a resistive transistor having a first electrode thereof connected to the output signal line, having a second electrode thereof connected to a direct-current voltage, and having a control electrode thereof connected to a direct-current voltage.

45. A photoelectric converting device as claimed in claim 44, wherein said amplifying transistor is an N-channel MOS transistor, and the direct-current voltage applied to the first electrode of said amplifying transistor is higher than the direct-current voltage connected to the second electrode of said resistive transistor.

46. A photoelectric converting device as claimed in claim 44, wherein said amplifying transistor is a P-channel MOS transistor, and the direct-current voltage applied to the first electrode of said amplifying transistor is lower than the direct-current voltage connected to the second electrode of said resistive transistor.

47. A photoelectric converting device as claimed in claim 43, wherein said PCC comprises:

a photoelectric conversion element that receives at a first electrode thereof a direct-current voltage; and a transistor having a first electrode, a second electrode, and a control electrode, the first and control electrodes of said transistor being connected to a second electrode of the photoelectric conversion element so as to receive an output current from the photoelectric conversion element, wherein a voltage signal appearing at the control electrode of said transistor is used as an output signal.

48. A photoelectric converting device as claimed in claim 43, wherein said PCC comprises:

a photoelectric conversion element that receives at a first electrode thereof a direct-current voltage; and a transistor having a first electrode, a second electrode, and a control electrode, the first electrode of said transistor being connected to a second electrode of the photoelectric conversion element so as to receive an output current from the photoelectric conversion element, the second and control electrodes of said transistor being connected together, wherein a voltage signal appearing at the first electrode of said transistor is used as an output signal.

49. A photoelectric converting device as claimed in claim 43, wherein said PCC comprises:

a photodiode that receives at a first electrode thereof a direct-current voltage; and a MOS transistor having a first electrode, a second electrode, and a gate electrode, the first and gate electrodes of said MOS transistor being connected to a second electrode of the photodiode so as to receive an output current from the photodiode, wherein a voltage signal appearing at the gate electrode of said MOS transistor when said MOS transistor is made to operate in a subthreshold region below a threshold level thereof is used as an output signal.

50. A photoelectric converting device as claimed in claim 43, wherein said PCC comprises:

a photodiode that receives at a first electrode thereof a direct-current voltage; and a MOS transistor having a first electrode, a second electrode, and a gate electrode, the first electrode of said MOS transistor being connected to a second electrode of the photodiode so as to receive an output current from the photodiode, the second and gate electrodes of said MOS transistor being connected together, wherein a voltage signal appearing at the first electrode of said MOS transistor when said MOS transistor is made to operate in a subthreshold region below a threshold level thereof is used as an output signal.

51. A photoelectric converting device comprising:

a photoelectric conversion circuit (PCC) for generating an analog electric signal in accordance with an amount of incident light, wherein intensity of the analog electric signal is logarithmically proportional to the amount of the light, wherein said PCC comprises:

a photoelectric conversion element that receives at a first electrode thereof a direct-current voltage; and a transistor having a first electrode, a second electrode, and a control electrode, the first electrode of said transistor being connected to a second electrode of the photoelectric conversion element so as to receive an output current from the photoelectric conversion element, said transistor receiving at the control electrode thereof a direct-current voltage, wherein a voltage signal appearing at the first electrode of said transistor is used as an output signal; and an amplifying circuit, connected to said PCC, for amplifying the analog electric signal outputted from said PCC, wherein no integrator circuit is provided between said PCC and said amplifying circuit.

52. A photoelectric converting device as claimed in claim 51, wherein said photoelectric conversion element is a photodiode said transistor is a MOS transistor, the control electrode being the gate electrode thereof; and a voltage signal appearing at a first electrode of said MOS transistor when said MOS transistor is made to operate in a subthreshold region below a threshold level thereof is used as the output signal.

* * * * *

UNITED STATES PATENT AND TRADEMARK OFFICE

CERTIFICATE OF CORRECTION

PATENT NO. : 6,967,682 B1 
DATED : November 22, 2005
INVENTOR(S) : Yoshio Hagihara It is certified that error appears in the above-identified patent and that said Letters Patent is hereby corrected as shown below:

Column 35,
Line 5, delete "device as claimed in comprising:" and insert -- device comprising: --.

Column 40,
Line 27, delete "photodiode said" and insert -- photodiode; said --.

Signed and Sealed this

Fourteenth Day of February, 2006

JON W. DUDAS
*Director of the United States Patent and Trademark Office*